US012498115B2

(12) United States Patent (10) Patent No.: US 12,498,115 B2
Harrington et al. (45) Date of Patent: Dec. 16, 2025

(54) NON-GAS FIRE PIT

(71) Applicant: Lamplight Farms Incorporated, Menomonee Falls, WI (US)

(72) Inventors: Steven Merrill Harrington, Cardiff by the Sea, CA (US); Michael Sawalski, Racine, WI (US); Ryan Butrym, Cardiff by the Sea, CA (US); Robert Woodruff, Oconomowoc, WI (US); Joel Kramka, Madison, WI (US); Megan Piunti, Fitchburg, WI (US); Montel Caruthers, Madison, WI (US)

(73) Assignee: Lamplight Farms Incorporated, Menomonee Falls, WI (US)

( * ) Notice: Subject to any disclaimer, the term of this patent is extended or adjusted under 35 U.S.C. 154(b) by 0 days.

(21) Appl. No.: 18/628,432

(22) Filed: Apr. 5, 2024

(65) Prior Publication Data

US 2024/0288156 A1 Aug. 29, 2024

Related U.S. Application Data

(63) Continuation of application No. 17/088,300, filed on Nov. 3, 2020, now Pat. No. 11,953,198, which is a continuation-in-part of application No. 16/578,926, filed on Sep. 23, 2019, now Pat. No. 11,092,342.

(60) Provisional application No. 62/734,753, filed on Sep. 21, 2018.

(51) Int. Cl.
*F23B 20/00* (2006.01)
*F23B 60/02* (2006.01)
*F23L 9/02* (2006.01)

(52) U.S. Cl.
CPC .............. *F23B 20/00* (2013.01); *F23B 60/02* (2013.01); *F23L 9/02* (2013.01)

(58) Field of Classification Search
CPC .................................. F24B 1/19; F24B 1/193
See application file for complete search history.

(56) References Cited

U.S. PATENT DOCUMENTS

| | | | | |
|---|---|---|---|---|
| 1,504,924 | A * | 8/1924 | Anderson | F28D 7/1669 122/222 |
| 2,303,406 | A * | 12/1942 | Smerling | F23H 9/02 110/277 |
| 11,092,342 | B2 * | 8/2021 | Harrington | F24B 13/006 |
| 11,953,198 | B2 * | 4/2024 | Harrington | F23L 9/02 |
| 2004/0173207 | A1 * | 9/2004 | Chandaria | F24B 15/005 126/540 |
| 2014/0238378 | A1 * | 8/2014 | Scott | F24B 1/181 126/55 |
| 2015/0338104 | A1 * | 11/2015 | Lipinski | F24B 1/022 126/21 R |

FOREIGN PATENT DOCUMENTS

| | | | | |
|---|---|---|---|---|
| WO | WO-2017181056 A1 * | 10/2017 | | A47J 37/07 |
| WO | WO-2018160767 A1 * | 9/2018 | | F24B 1/19 |

* cited by examiner

*Primary Examiner* — David J Laux
(74) *Attorney, Agent, or Firm* — GableGotwals; David G. Woodral

(57) ABSTRACT

A fire pit includes an combustion chamber having at least one wall defining an inner chamber. At least one primary air aperture is defined through the inner chamber wall at a first, lower level, and at least one secondary air aperture is defined through the inner chamber wall at a second, upper level. A fuel grate is supported within the inner chamber at a level between the lower level and the upper level.

2 Claims, 20 Drawing Sheets

NON-GAS FIRE PIT

CROSS-REFERENCE TO RELATED CASES

This application is a continuation of U.S. patent application Ser. No. 17/088,300 entitled NON-GAS FIRE PIT filed on Nov. 3, 2020 which is a continuation-in-part of U.S. patent application Ser. No. 16/578,926 entitled NON-GAS FIRE PIT filed on Sep. 23, 2019 which claims the benefit of U.S. provisional patent application Ser. No. 62/734,753 entitled NON-GAS FIRE PIT, filed on Sep. 21, 2018, the contents of which are hereby incorporated by reference.

FIELD OF THE INVENTION

This disclosure relates to fire pits in general and, more specifically, to non-gas-burning fire pits.

BACKGROUND OF THE INVENTION

Outdoor fire pits have, in the past, been permanent fixtures built from rock, concrete, metals, or other resilient and heavy materials. Often the fire pit is built directly on the ground and is not readily portable. Other fire pits have been developed that may be somewhat portable. However, in an effort to contain fire and ash combustion properties are less than desirable. Smoky fires, possibly with little light or radiated heat, have been the result.

What is needed is a system, device, and method for addressing the above, and related, concerns.

SUMMARY OF THE INVENTION

The invention of the present disclosure, in one aspect thereof, comprises a fire pit including an combustion chamber having at least one wall defining an inner chamber. At least one primary air aperture is defined through the inner chamber wall at a first, lower level, and at least one secondary air aperture is defined through the inner chamber wall at a second, upper level. A fuel grate is supported within the inner chamber at a level between the lower level and the upper level. Solid fuel supported by the fuel grate, when combusted, is provided primary combustion air from below the fuel grate by the primary air apertures and provided secondary combustion air from above the solid fuel by the secondary air apertures, the secondary combustion air promoting combustion of unburned gasified combustibles rising within the inner chamber.

The combustion chamber may comprise a pair of spaced apart end walls and a pair of spaced apart side walls, the pair of spaced apart side walls and pair of spaced apart end walls defining the inner chamber therebetween. The pair of spaced apart end walls may be angled together toward a top of the combustion chamber. The pair of spaced apart side walls may also be angled together toward a top of the combustion chamber. The pair of spaced apart side walls and pair of spaced apart end walls may provide for a parallelepiped configuration.

Some embodiments further comprise a shroud surrounding the combustion chamber and spaced apart therefrom to form an intake chamber. The shroud may further define at least one aperture for admitting air to the intake chamber from outside the fire pit. The shroud may have a parallelepiped configuration with a taper opposite a taper of the combustion chamber.

In some embodiments, the fuel grate comprises at least one ridge extending upwardly therefrom.

In further embodiments, the at least one wall is formed into a frustoconical configuration with a narrower upper end and a wider bottom end. Such embodiments may include a shroud surrounding the at least one wall and being spaced apart therefrom to define an intake chamber. Such shroud may define at least one aperture for admitting air to the intake chamber from outside the firepit. The shroud may comprise a frustoconical configuration with a taper opposite a taper of the at least one inner wall.

The invention of the present disclosure, in another aspect thereof, comprises a fire pit with a shroud having a first air flow region admitting air from outside the shroud to inside the shroud, and an combustion chamber at least partially contained within the shroud, an intake chamber being defined between the combustion chamber and the shroud, and an inner chamber being defined by at least one combustion chamber wall. The combustion chamber has at second air flow region admitting combustion air from the intake chamber to the inner chamber. The inner chamber has a tapered configuration having a smaller horizontal cross-sectional area toward a top thereof than a bottom thereof.

In some embodiments, the combustion chamber comprises a four-walled structure with the walls tapering inward toward the top thereof. The four-walled structure may have a rectilinear horizontal cross section.

In some cases, the first air flow region comprises a first plurality of apertures defined in the four-walled structure below a fuel grate situated in the combustion chamber, and a second air flow region is defined by a second plurality of apertures defined in the four-walled structure below the fuel grate.

The invention of the present disclosure, in another aspect thereof, comprises a fire pit with an combustion chamber formed from four inwardly walls such that an interior combustion chamber is defined by the sidewalls to have a larger bottom cross-sectional area and a smaller top cross-sectional area. The fire pit has a shroud surrounding the combustion chamber and spaced apart therefrom to define an air intake region therebetween. The combustion chamber provides a plurality of primary air apertures along a bottom of at least one of the four inwardly angled walls admitting primary combustion air from the intake region into the combustion chamber. The combustion chamber also provides a plurality of secondary air apertures along a top of at least one of the four inwardly angled walls admitting secondary combustion air from the intake region into the combustion chamber.

The fire pit may have a fuel grate supported inside the combustion chamber between the primary air apertures and the secondary air apertures, the fuel grate having a plurality of support ridges for supporting solid fuel above air openings in the fuel grate.

In some embodiments, two of the four walls have a first longer length and are used as sidewalls and the other two of the four walls have a second shorter length and are used as end walls such that the combustion chamber and combustion chamber are rectangular in horizontal cross section. In such cases the two sidewalls provide both primary and secondary air intake apertures and the two end walls provide secondary air apertures.

DETAILED DESCRIPTION OF THE PREFERRED EMBODIMENTS

Figure 1:
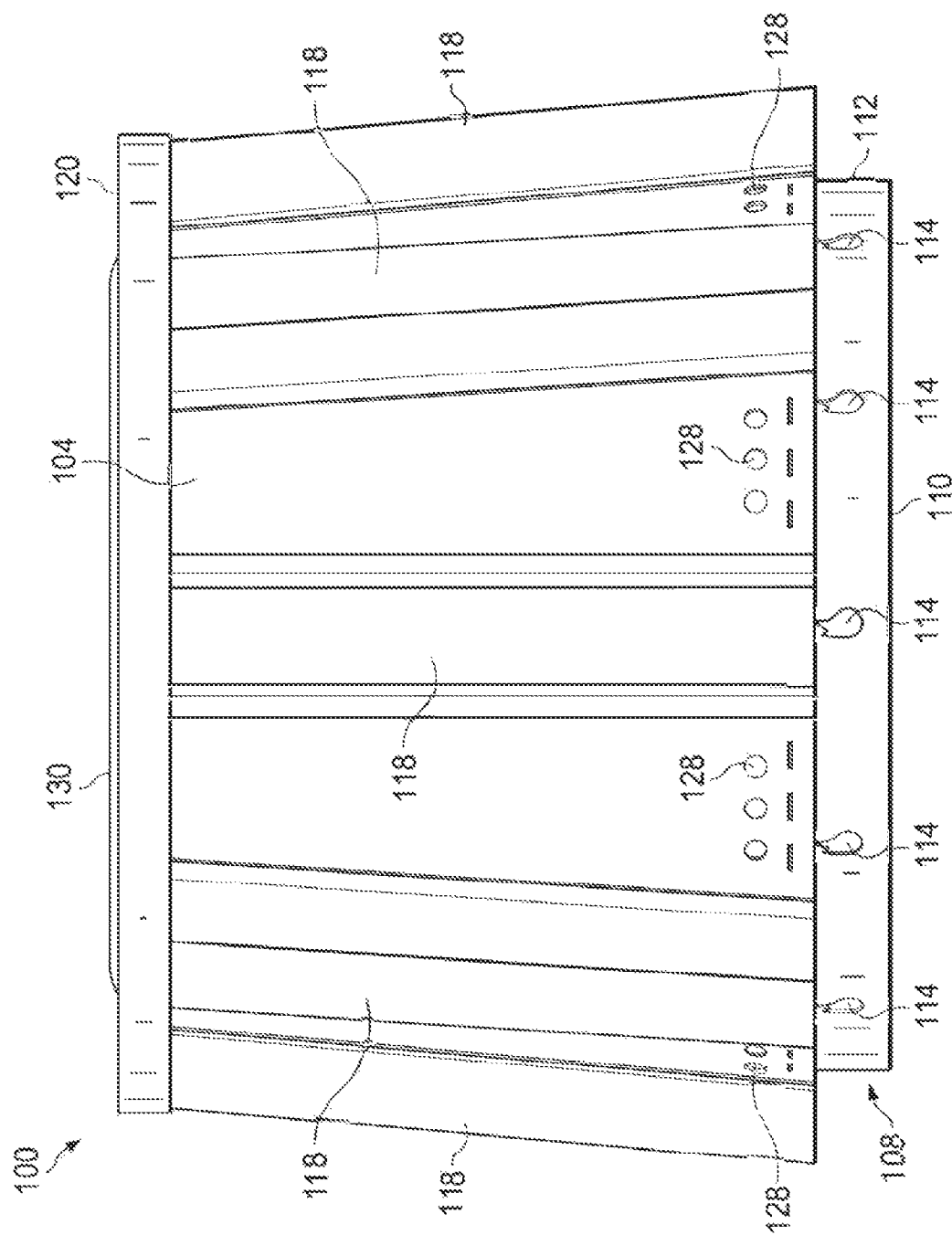
FIG. 1 is a side view of one embodiment of a fire pit according to aspects of the present disclosure.
Figure 2:
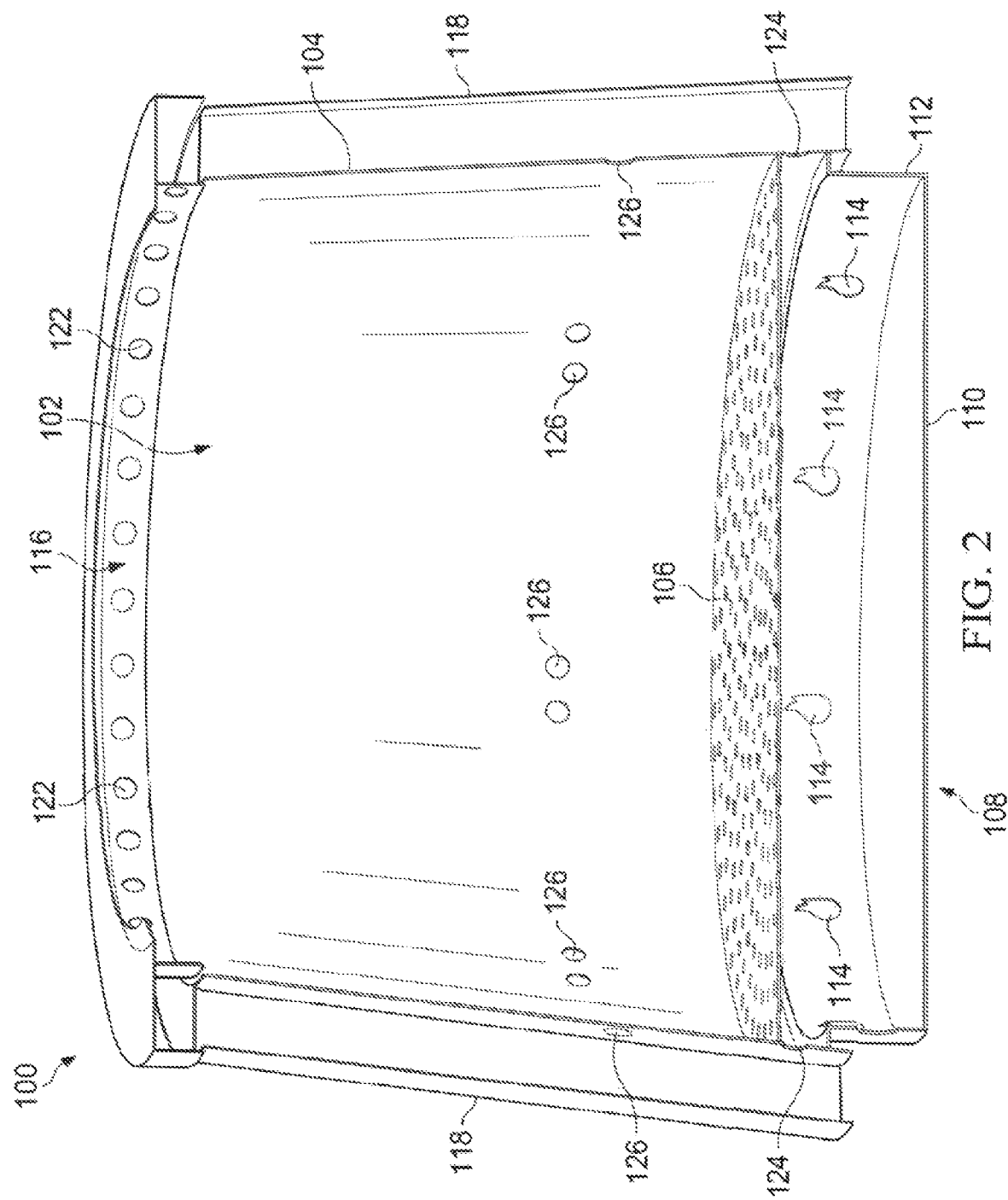
FIG. 2 is a side cutaway view of the fire pit of FIG. 1.
Figure 3:
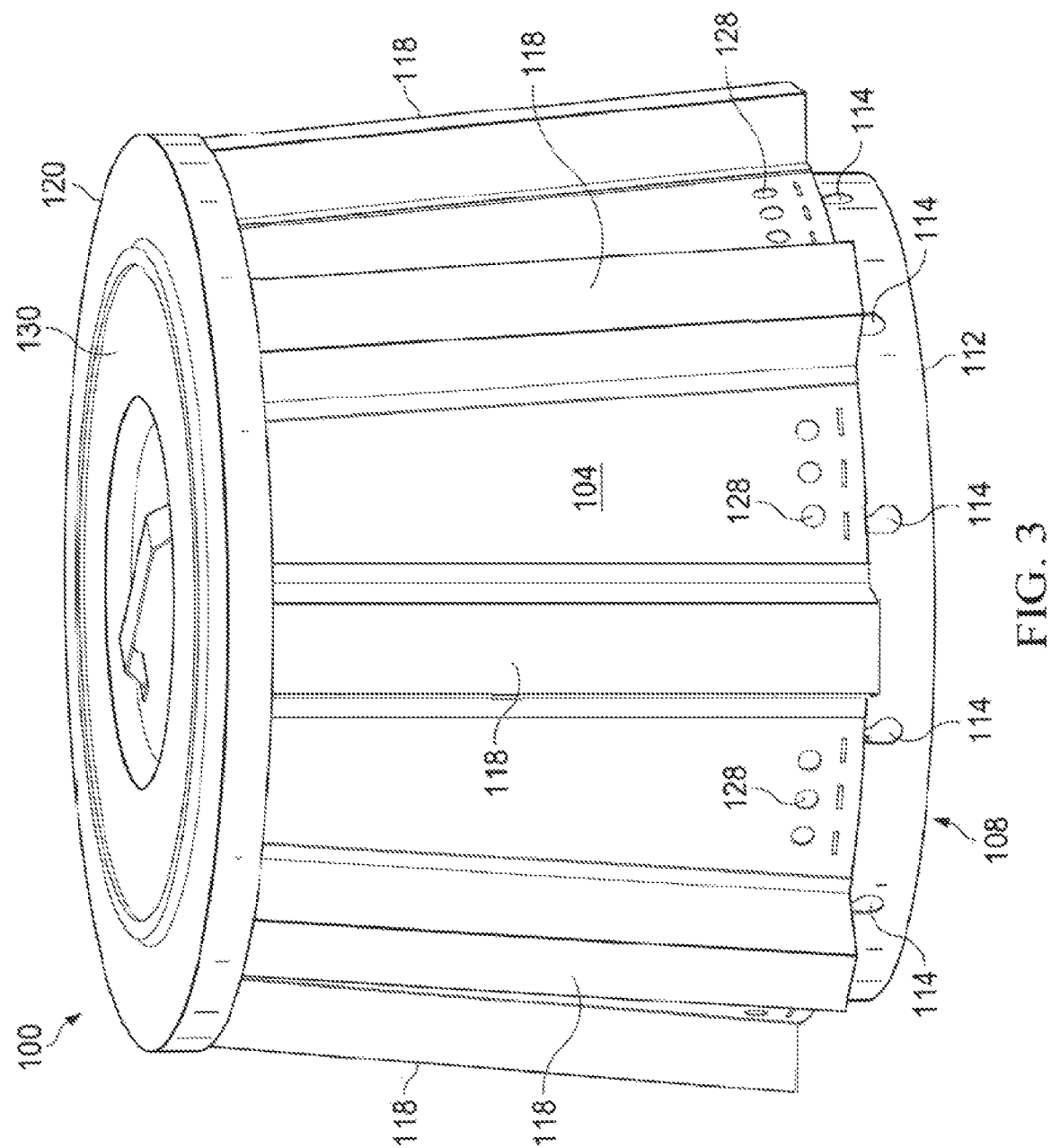
FIG. 3 is a perspective view of the fire pit of FIG. 1.
Figure 4:
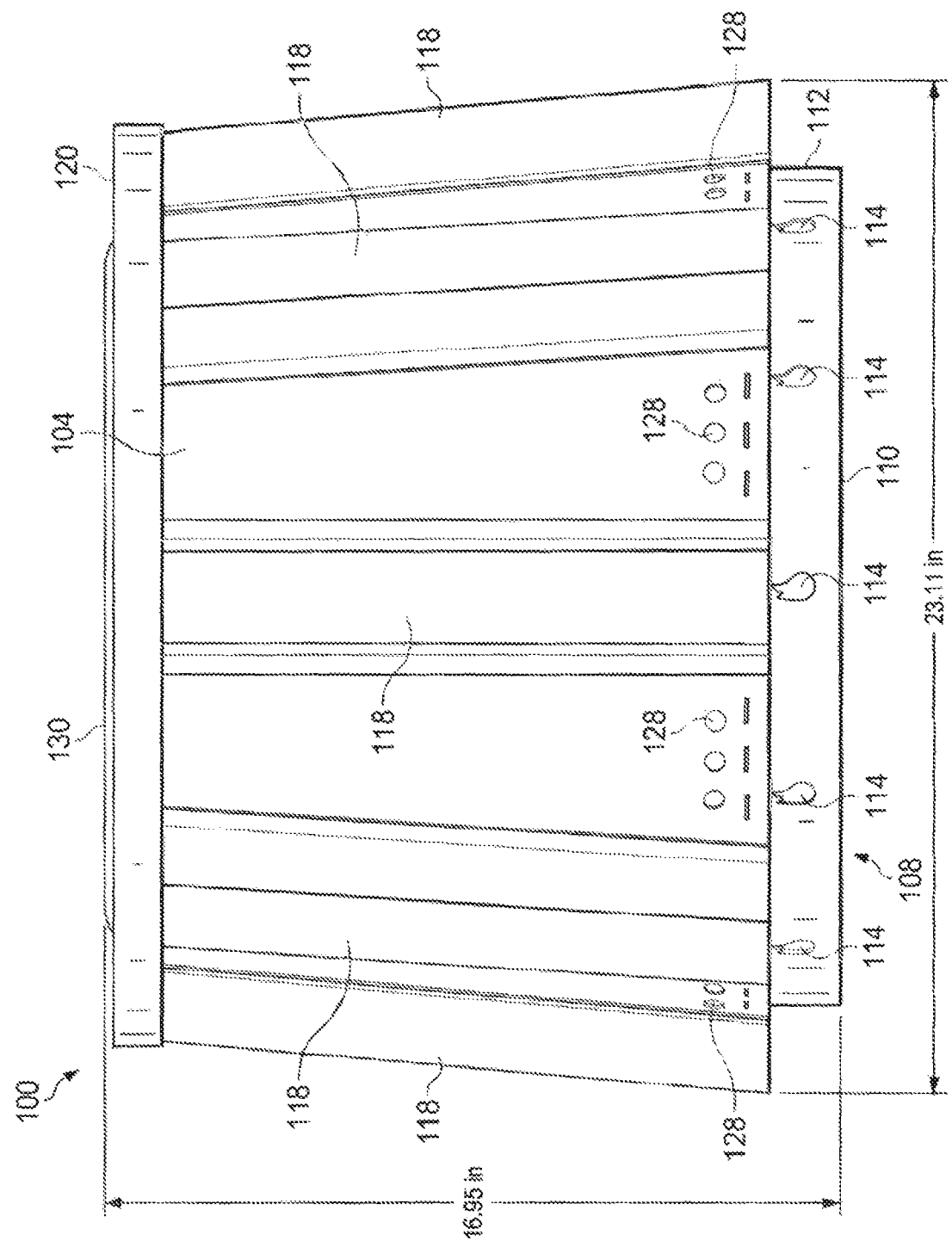
FIG. 4 is a side view with indicated dimensions of the fire pit of FIG. 1.

Referring now to FIGS. 1-4, a fire pit 100 can be seen. FIG. 1 is a side view of the fire pit 100 while FIG. 2 is a side cutaway view, FIG. 3 is a perspective view, and FIG. 4 is a side view with indicated exemplary dimensions of the fire pit of FIG. 1.

The fire pit 100 may be configured to burn wood pellets, whole sticks of wood, charcoal, or another suitable solid fuel. The fire pit 100 provides an inner chamber 102 bound by an inner chamber wall 104. In various embodiments, the inner chamber 102 is frustoconical in shape and may taper from a relatively wider base to a relatively narrower upper end. Various structures and components of the fire pit 100, including the inner chamber wall 104, may comprise stainless steel or another suitably heat resistant material. The inner chamber wall 104 may be uninsulated and/or of a single layer or thickness. The inner chamber wall 104 is intended to radiate heat from an internal fire outward and away from the fire pit 100 to be enjoyed by a user of the fire pit 100. In some embodiments, the inner chamber wall 104 may form what is considered an combustion chamber of the fire pit 100.

The inner chamber 102 may have a fuel support grate 106 at or near a bottom end thereof. The grate 106 supports burning fuel and may allow ash to fall therethrough. Combustion air may be provided upwardly through the grate 106. The inner chamber 102 may rest upon or attach to a base 108, that may be pan-shaped to retain ash from the fuel support grate 106. The base 108 may have a pan 110 with a perimeter affixed to an upright, possibly cylindrical portion 112 supporting the inner chamber wall 104. Air intake openings 114 may be provided in the upright portion 112 for feeding combustion air to the fuel support grate 106. In some embodiments, the inner chamber wall 104 is separable from the base 108 to facilitate emptying of ashes and other cleaning tasks.

In operation, as fuel is combusted on the fuel support grate 106, heated gases rise through the inner chamber 102 and out through a top opening 116 in the upper narrower portion of the inner chamber 102. Gases rising from the fuel on the fuel support grate 106 may not be completely combusted and performance of the fire pit 100 may be altered by providing additional air into the inner chamber 102. In various embodiments, a number of outer chambers 118 may be configured to provide additional air that may be drawn along the outside of the inner chamber wall 104. The inner chamber wall 104 may provide heating of air drawn into the outer chambers 118 thereby promoting rapid combustion inside the inner chamber 102 when the air drawn in through the secondary chambers 118 reaches incompletely combusted gases within the inner chamber 102.

In the present embodiment, there are eight secondary chambers 118 spaced roughly equidistantly around the inner chamber wall 104. However, more or fewer secondary chambers 118 may be utilized. In various embodiments, the secondary chambers 118 may cover less than half of the total outer surface area of the inner chamber wall 104. In this way, a user may experience an adequate level of radiated or infrared heat from the inner chamber wall 104, while a sufficient amount of heat is also transferred to the air inside the secondary chambers 118 to promote rapid combustion upon entering the inner chamber 102.

An upper manifold 120 may be provide at or near the top of the inner chamber 102. The manifold accepts incoming heated air from the secondary chambers 118 that may be expelled via a plurality of inward facing apertures 122. The apertures 122 provide "jets" of heated combustion-promoting air to the hot and incompletely combusted gases rising from the fuel on the fuel support grate 106. This additional air promotes further combustion of the gases resulting in an increase in visible flames and heat, and a decrease in smoke resulting from otherwise incomplete combustion.

Various embodiments of the present disclosure discuss and describe apertures, slots, spaces, and/or discrete openings defined in various surfaces or walls to allow or promote the flow of combustion air (primary or secondary). It should be understood that in other embodiments, grids, meshes, screens, or other air permeable materials or structures may also be used to admit necessary or desirable air flow. Unless otherwise defined more specifically, an air flow region through a structure should be taken to mean apertures, slots, spaces, and other discrete openings, or grids, meshes, screens, or other air permeable materials providing adequate air flow, passage, or permeability for the stated structure or function.

In some embodiments, a number of additional air inlets to the inner chamber may be provided directly from the secondary chambers 118. As best seen in FIG. 2, supplemental air intakes 124 may be provided below the level of the fuel support grate 106. These air intakes 124 may provide air that has received some degree of heating, but will not feed air to incompletely combusted gases as incompletely combusted gases will not occur until air has been drawn through, over, or across combusting fuel on the fuel support grate 106. Additionally, the degree of heating may be somewhat low at this point such that the supplemental air intakes 124 are essentially providing supplemental primary combustion air along with the air intakes 114.

Intermediate air intakes 126 may be formed at some elevation between the fuel support grate 106 and the upper manifold 120 as apertures in the inner chamber all 104 into respective secondary chambers 118. In the present embodiment, the air intakes 126 are formed roughly one third of the way up the inner chamber wall 104, but this may vary depending on desired performance. The higher the location of the air intakes 126 the more heating the air will have received before it enters the inner chamber 102 from the secondary chamber 118. However, the air intakes 126 are optional as are their size, number, and location.

On approximately the same level as supplemental air intakes 124 are unheated air intakes 125 that open directly to the outer atmosphere from the inner chamber 102. These air intakes 125 are optional as well and may be considered as providing additional primary combustion air. The air intakes 125 may be formed by apertures defined in respective portions of the inner chamber wall 104.

As best seen in FIG. 3, the fire pit 100 may be provided with a lid 130. The lid 130 serves to keep rain and other contaminants out of the fire pit 100 when not in use. In some embodiments, the total height of the fire pit 100 may be about 16.95 inches. The width at the widest point may be about 23.11 inches. Different embodiments may have dimensions that differ from these.

Figure 5:
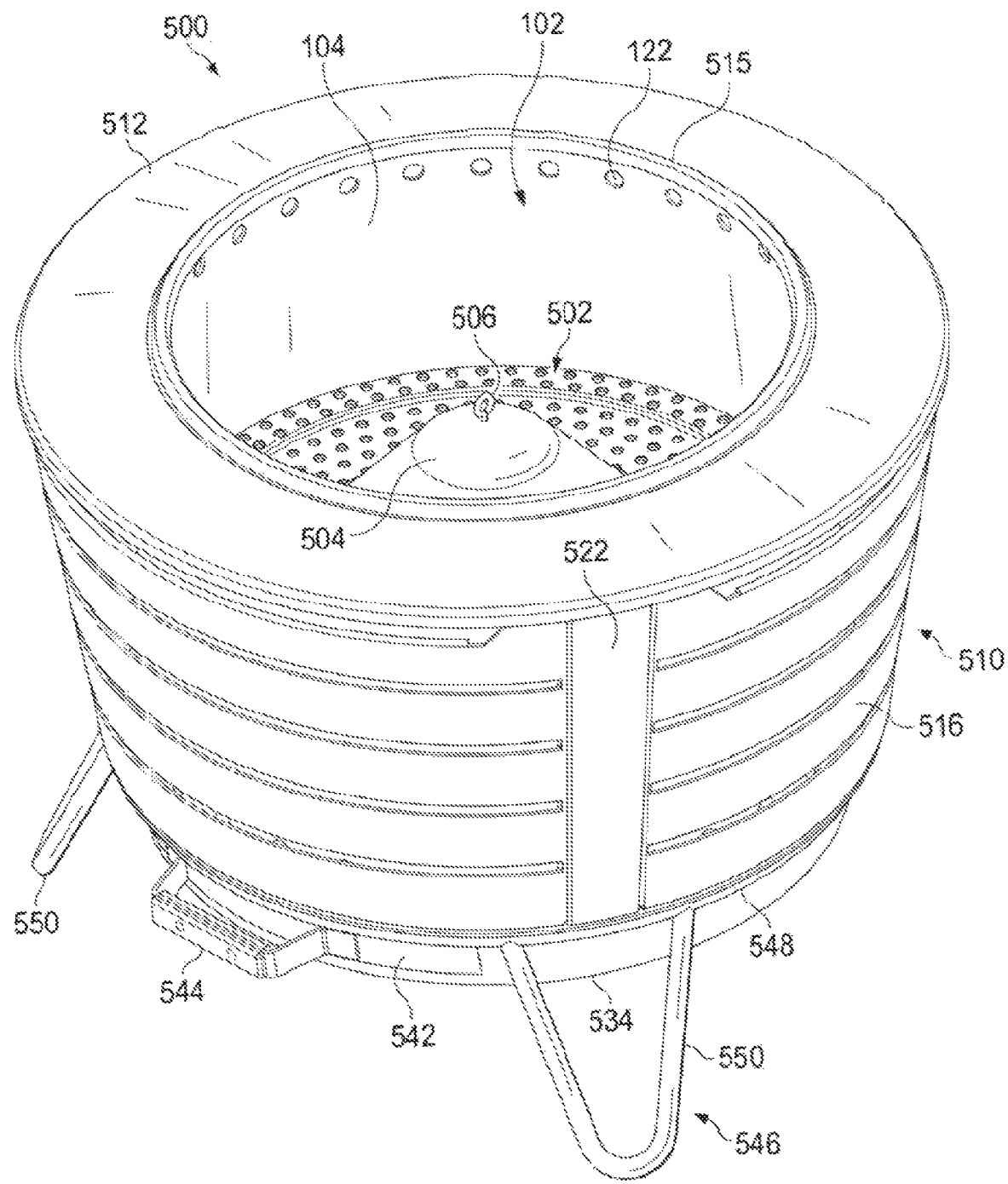
FIG. 5 is a side perspective view of another embodiment of a fire pit according to aspects of the present disclosure.
Figure 6:
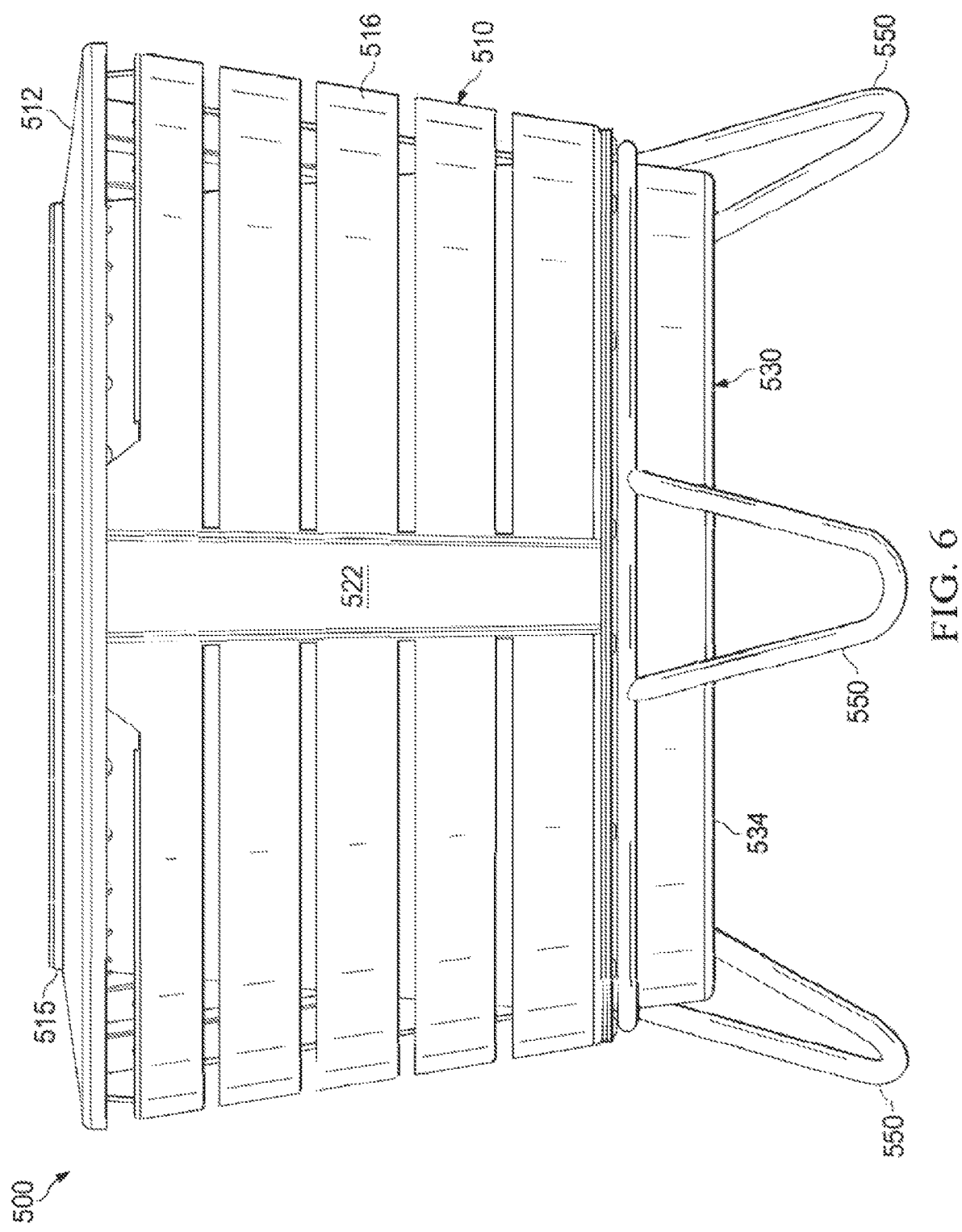
FIG. 6 is a side view of the fire pit of FIG. 5.
Figure 7:
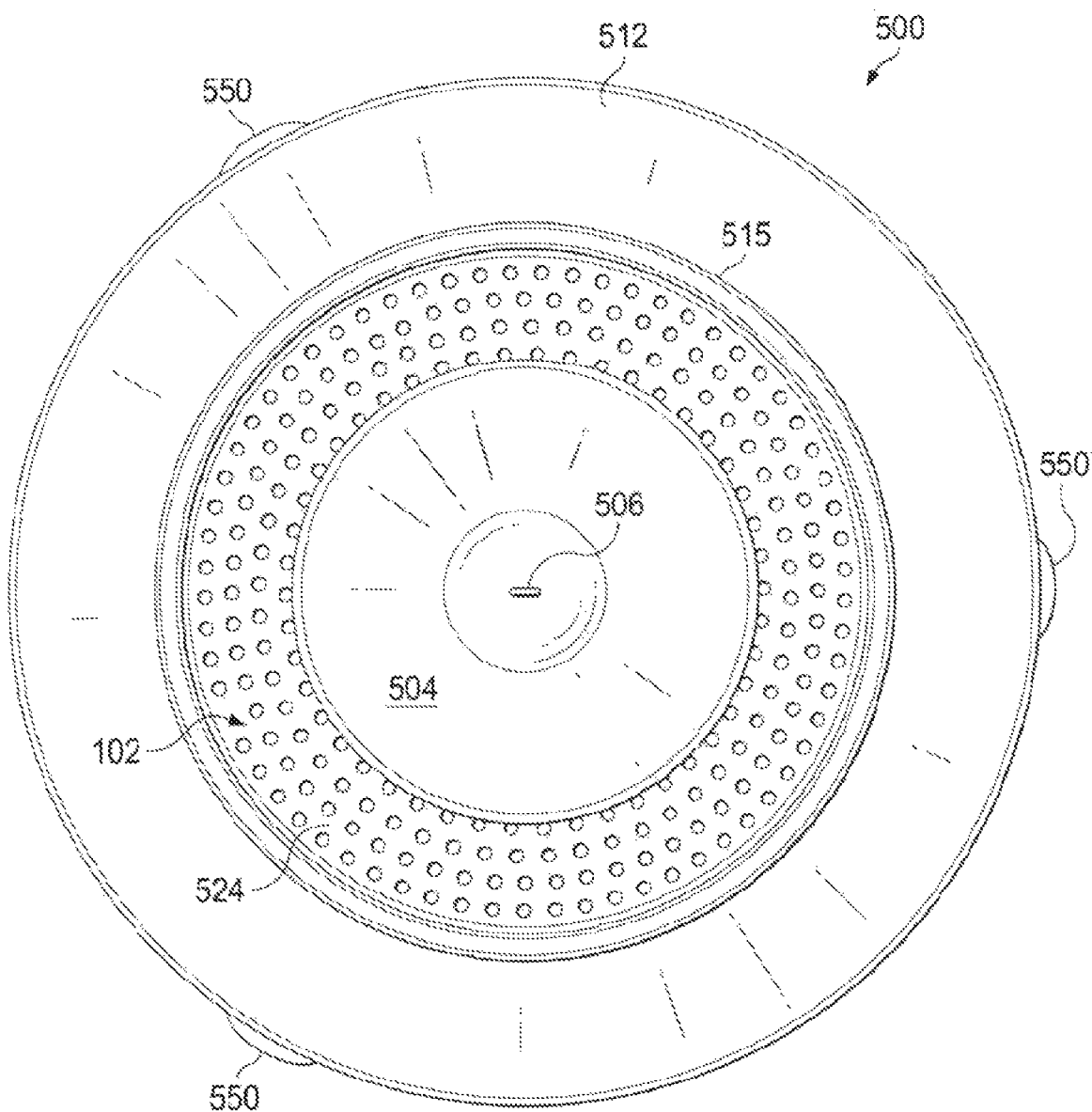
FIG. 7 is a top view of the fire pit of FIG. 5.
Figure 8:
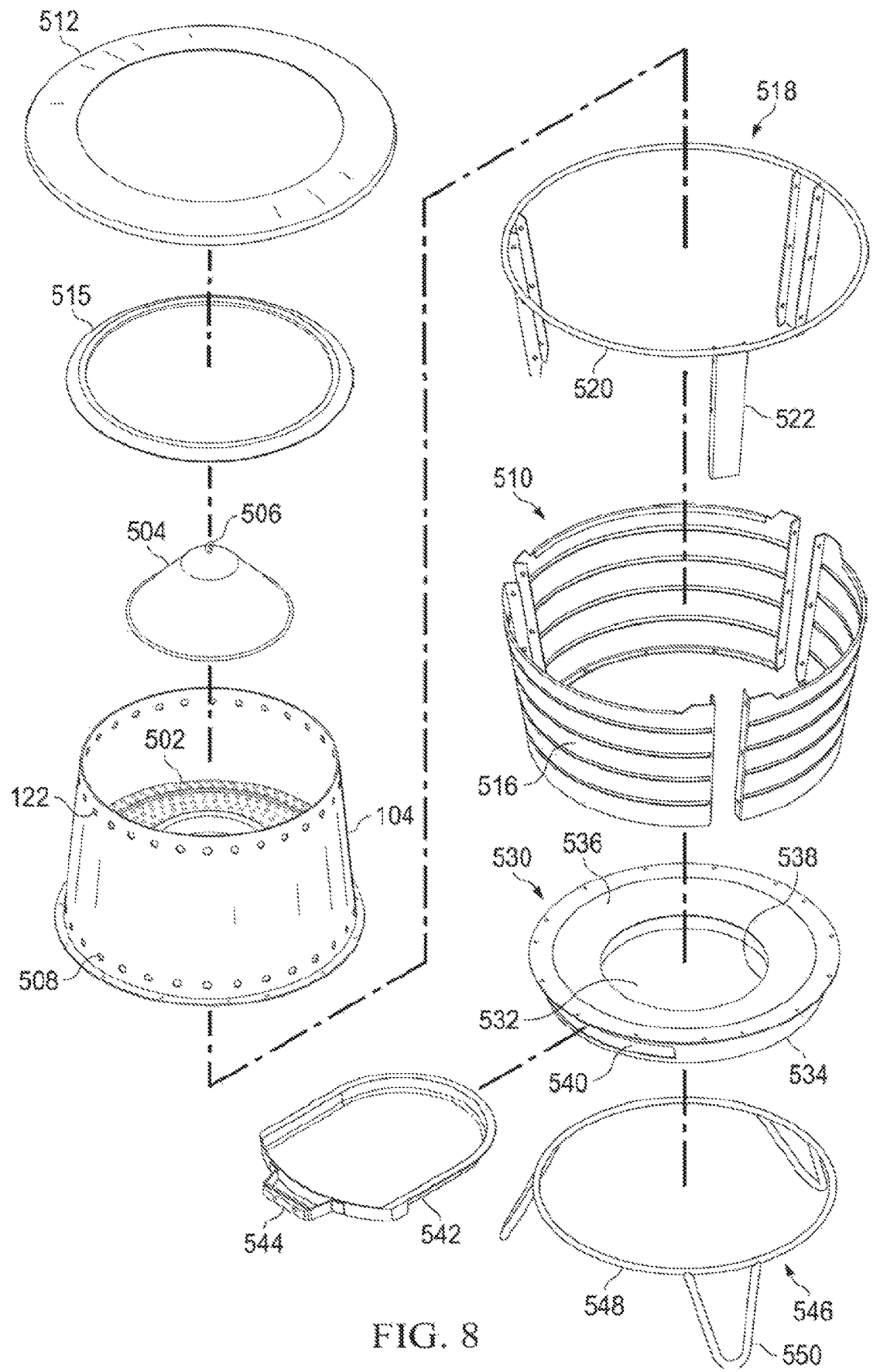
FIG. 8 is an exploded perspective view of the fire pit of FIG. 5.
Figure 9:
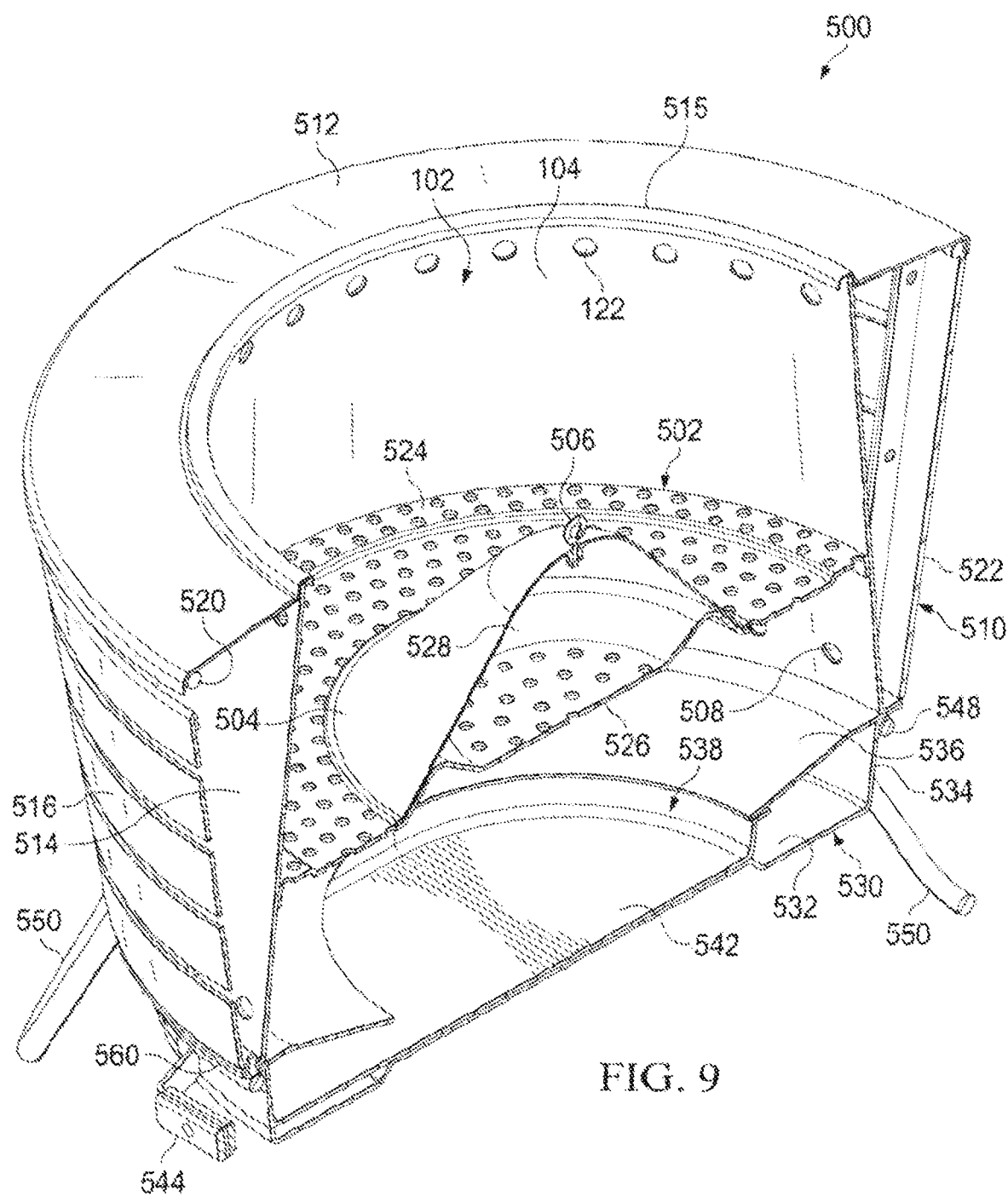
FIG. 9 is a side perspective cutaway view of the fire pit of FIG. 5.

Referring now to FIG. 5, a side perspective view of another embodiment of a fire pit 500 according to aspects of the present disclosure is shown. The fire pit 500 shares some features with the fire pit 100 discussed above but also differs in particular ways. FIG. 6 is a side view of the fire pit 500, while 7 is a top view, FIG. 8 is an exploded perspective view, and FIG. 9 is a side perspective cutaway view of the fire pit 500. FIGS. 5-9, taken together, may best illustrate the structure features of the fire pit 500.

The fire pit 500 comprises an inner chamber wall 104 defining an inner chamber 102, similar to the fire pit 100 discussed above. A fuel grate 502 is supported within the inner chamber 102 that is located medially between a top and bottom of the inner chamber wall 104, though in some embodiments it is nearer the bottom, as shown. The fuel grate 502 provides support for solid fuels to be burned in the fire pit 500. Being located or attached nearer the bottom of the inner chamber wall 104 means combustion takes place mostly within the inner chamber 102 and provides ample opportunity for radiative heating from the fire pit 500 without direct exposure to flame.

As best seen in FIG. 9, the fuel grate 502 is perforated to allow combustion air to flow therethrough, and as well as allowing ashes or spent fuel to fall through the fuel grate 502. The fuel grate 502 may be planar, generally planar, or flat with openings or perforations spread substantially evenly thereacross such that the entire fuel bed may be supplied with air as well as drained of ash or other debris. The fuel grate 502 may be round or generally round to mate with or affix to the circular inner chamber wall 104.

In some embodiments, the fuel grate 502 may be divided into an outer area 524 surrounding an inner area 526. The inner area 526 may be circular and the outer area 524 may be annular. In other embodiments the inner area 526 and outer area 524 have other cooperating shapes. Between the inner area 526 and outer area 524 may be a support ring 528. In the present embodiment, the support ring 528 is a short, sloped wall interposing the inner area 526 and outer area 524. It should be understood that the support ring 528, inner area 526, and outer area 524 may be separate regions of a contiguous fuel grate 502. The fuel grate 502 components may be formed as a monolithic whole (e.g., by machining or stamping) or may be fitted together after separate manufacture (e.g., by welding).

The support ring 528, in the present embodiment, locates a center deflector 504 that sits over the inner area 526 of the fuel support. The deflector 504 may be in configured as a cone that provides an outwardly sloping wall that tends to cause fuel placed into the inner chamber 102 to move toward the outer portion of the inner chamber 102, near the inner chamber wall 104. Thus, more combustion may take place near the inner chamber wall 104 to improve radiant heat transfer as well as the performance of the air flow mechanisms of the fire pit 500 discussed below.

The fire pit 500 may also be operated without the deflector 504, though the burn characteristics may change. A loop 506 may be provide for ease of removal of the deflector 504 by hand (if cool) or using a poker or other fire tool. The inner area 526 of the fuel grate 502 may be perforated similarly to the outer area 524. This may serve to aid in combustion if the fire pit 500 is operated without the deflector 504 and/or to facilitate ash removal or cleaning. It should be understood that the deflector 504, operating to urge fuel away from the center area 526 could comprise shapes different from that of a cone (although, in various embodiments, it would be advantageous to retain sloping walls or a similar feature). However, a cone-shaped deflector 504 in cooperation with a circular support ring 528 may be concentric to the outer area 524 of the fuel grate 502 as well as the inner chamber wall 104, thus promoting even burning and radiant heating all the way around the fire pit 500.

The inner chamber wall 102 may be frustoconical in shape, and narrower at the top than the bottom. It may define a plurality of primary air intakes or apertures 508 near the bottom thereof. The fuel grate 502 may be situated superior to, or above, these primary air intakes 508. Air entering these intakes 508 may ultimately provide initial combustion air to fuel on the fuel grate 502 as explained further below. Nearer the top of the inner chamber wall (in some embodiments, just below a top edge) are the apertures 122, which serve here as secondary air intakes. Air entering through these holes or apertures 122 may be heated by passing near an outside of the inner chamber wall 104 and provide additional oxygen for combusting unburned and possibly already heated combustibles (mostly in gaseous form) rising near the top of the inner chamber 102 from the fire below on the fuel grate 502.

Immediately outside the inner chamber wall 102 (where heating of secondary air occurs) may be a surrounding intake chamber 514. The intake chamber 514 serves as a manifold for air combing from outside the fire pit 500 and into the inner chamber 104 via apertures 508 and apertures 122. The intake chamber 514 may also be considered a heating chamber since this is where combustion air is primarily heated during operation of the fire pit 500.

The intake chamber 514 may be bounded on the outside by an outer wall 510. The outer wall 510 may be frustoconical but larger at a bottom thereof than a top. Thus, the outer wall 510 may be relatively close to, and possibly touching or connected to, the inner chamber wall 104 at or near the bottom of both of these. Toward the top of both the inner chamber wall 104 and the outer wall 510 these two components may be spaced apart. A top panel may close or cover the space between the inner chamber wall 104 and the outer wall 510 near or on the top of these. As can be seen in FIG. 9, for example, this may lend a triangular cross section to the intake chamber 514. The intake chamber 514 may generally define an anulus concentric with the inner chamber 102, which may provide even heating all around the fire pit 500.

In order to admit air from outside the fire pit 500, the outer wall 510 may have a slatted configuration. The outer wall 510 may comprise a number of spaced apart slats 510. Spacing between the slats 510 may vary but in some embodiments spacing between each set of adjacent slats 516 is the same or substantially the same. Little spacing may be needed to admit sufficient air and it may be advantageous to space the slats fairly close together to improve heating of air in the intake chamber 104. As with other components of the fire pit 500 the slats may comprise a metal to promote even and adequate radiant heating outside the fire pit. In some embodiments, rather than discrete slats 510, the wall 500 may comprise one or more sections with openings cut or defined therein replicating the functionality of the slatted configuration.

As may be best seen in FIG. 8, each slat 516 may not define a complete circle around the inner chamber wall 104, but may represent only a portion of a circle arc. In some embodiment, each slat (e.g., at each level) may be broken into three arcs. A wall frame 518 may provide a top ring 520 from which descends one or more support members 522. The slats 516 may affix to these support members 522, which may be equidistantly spaced from one another around the top ring 520. In the illustrated configuration, the slats 516 run horizontally or generally horizontally. Thus, air is supplied into the intake chamber 514 in a substantially concentric manner to the inner chamber wall 102. The support members 522, at least where their number is limited (e.g., here to three) do not substantially interfere with even air flow or heating. In other embodiments, a series of vertical slats may be used. In further embodiments, the outer wall 510 may be a solid component that has had openings (vertical or horizontal) cast into it (or milled, cut, or punched therefrom).

The intake chamber 514, the inner chamber 102, and the components defining those parts, may sit atop or affix to a base 530. The base 530 may support the intake chamber 514 and inner chamber 102 above the ground and provide ash handling capabilities. The base 530 may comprise a floor 532 affixed to a surrounding outer wall 534. Over the floor 532 and below the fuel support grate 502 a funnel 536 may be provided with a central opening 538. The funnel 536 urges ash and debris from combustion toward the center of the floor 532.

An opening 540 (FIG. 8) may be defined in the wall 534 for accepting a removable ash pan 542 situated below the opening 538 of the funnel 536. A heat resistant handle 544 (comprising, e.g., wood or plastic) may affix to the ash pan 542 for removal and insertion of the ash pan 542.

The base 530 may also be fitted with a stand 546 (FIG. 9). The stand 546 may comprise a support ring 546 which may receive the base 530 as well as locate legs 550. Three legs 550 are shown but more or fewer (depending on their shape) could be utilized. As can be seen in FIG. 9, the support ring 548 of the stand 546 may fit into a lip 560 on the wall 534 of the base 530. The outer wall 510 and the inner chamber wall 104 may each also affix to this lip 560 or another nearby location.

As discussed above, the outer wall 510 may provide a wall frame 518 having a top ring 520. This may serve as a point to which the top panel 512 affixes to span the space between the outer wall 510 and the inner chamber wall 104 (in other embodiments the top panel 512 may attach elsewhere, e.g., to a top slat 516). A chamber top ring 515 may join the top panel 512 to the top of the inner chamber wall 104, or these components may join without a fastener (e.g., by folding together) or by welding. In any event, the top panel 512 is securely fixed to retain the outer wall 510 in a spaced apart relationship from the inner chamber wall 104. The top panel 512 also, therefore, partially defines the intake chamber 514 and prevents air from escaping.

Figure 10:
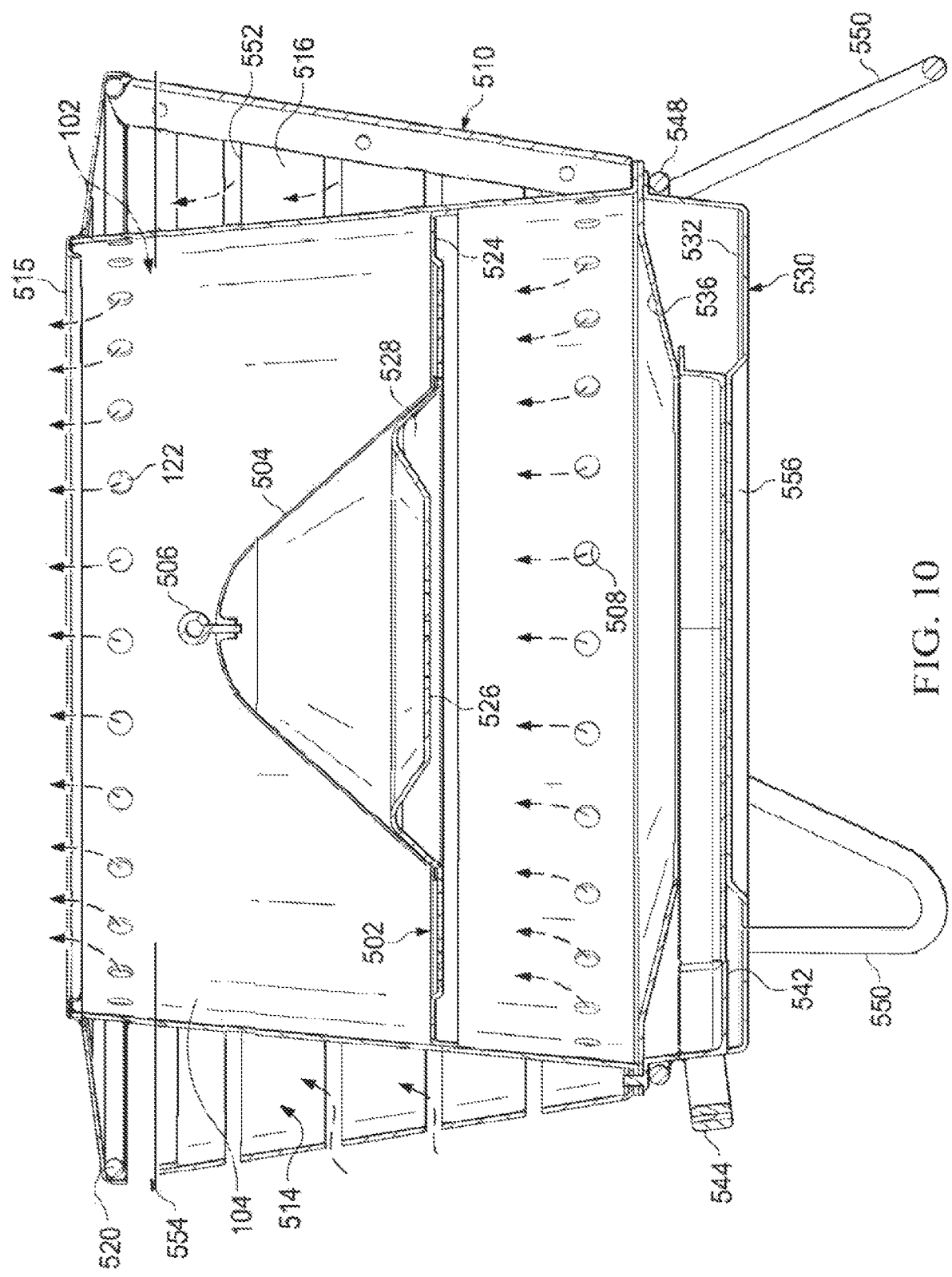
FIG. 10 is a side cutaway view of the fire pit of FIG. 5 illustrating exemplary air flow through the device in operation.

Referring now to FIG. 10, a side cutaway view of the fire pit 500 of FIG. 5 illustrating exemplary air flow through the device in operation is shown. Air can be seen to enter into the intake chamber 514 from outside the fire pit 500 via spaces 552 between adjacent slats 516 and space 554 between the top of the slats 516 and the top panel 512. Some air from the intake chamber 514 (particularly from spaces between some of the lower of the slats 516) is drawn through primary air intake apertures 508 and to and through the fuel grate 502. As shown, this air will particularly flow to and through the outer area 524 of the fuel grate 502 if the deflector 504 is in place. If the deflector 504 is not in place, air flows to and through the inner area 526 more readily as well. Air entering the inner chamber 102 via primary air intakes 508 may not be particularly heated.

Air entering the intake chamber 514 may also flow up along the inner chamber wall 104, which may have a relatively high temperature owing to the fire operating inside the inner chamber 102 (and particularly on or near the outer area 524 of the fuel grate 502). Such air will become heated via radiant and convective heating. The heated air rises to the apertures 102 where in enters the inner chamber 102 near the top thereof. As discussed above, gases coming from the combusting fuel on the fuel grate 502 generally include unburned flammables. Limited oxygenation from the primary combustion air (even where primary combustion air flow is not restricted) is one cause of the unburned flammables. In some cases, injection of secondary air does little to promote further consumption of these unburned flammables because of the relatively low temperature of the ambient air. Here, however, the secondary combustion air is heated within the intake chamber 514 and is more useful for further burning of the unspent fuel. This secondary burning provides additional heating as well as a reduction in smoke.

From the view of FIG. 10, it can also be seen that the floor 532 of the base 530 may provide a support 556 for receiving the ash pan 542 and supporting it in the best location below the funnel 536 (e.g., under the opening 538 shown in FIG. 9).

Dimensions of the fire pit 500 may vary. However, in one embodiment the height of the fire pit, including the legs 550, is about 19.3 inches. Exclusive of the legs 550, the height may be about 14.9 inches. A total diameter of the fire pit 500 may be about 24.6 inches. Thus, the fire pit 500 may be conveniently sized to provide a usable fire, yet small enough to be moved.

Figure 11:
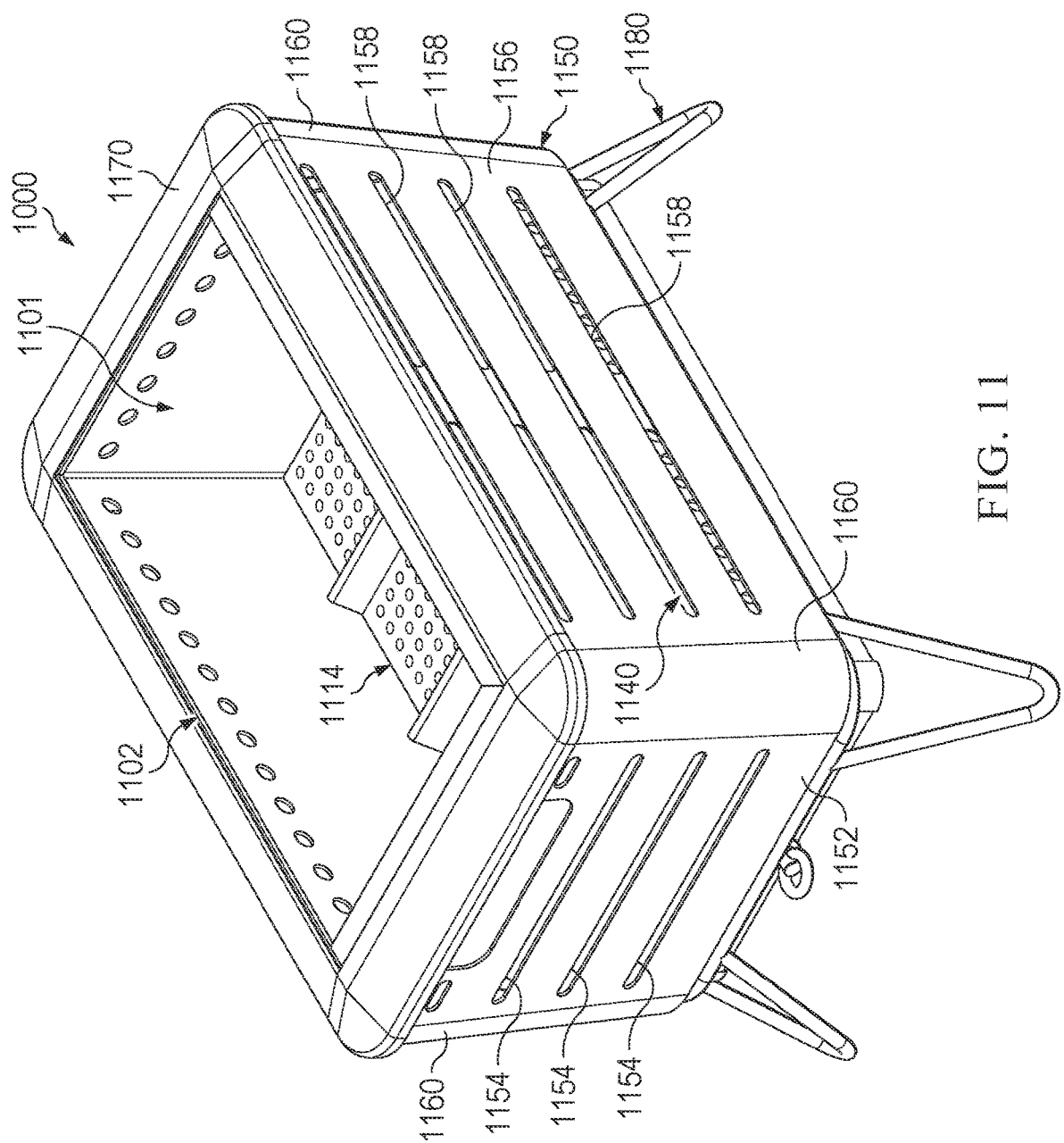
FIG. 11 is a perspective view of another embodiment of a fire pit according to aspects of the present disclosure.
Figure 12:
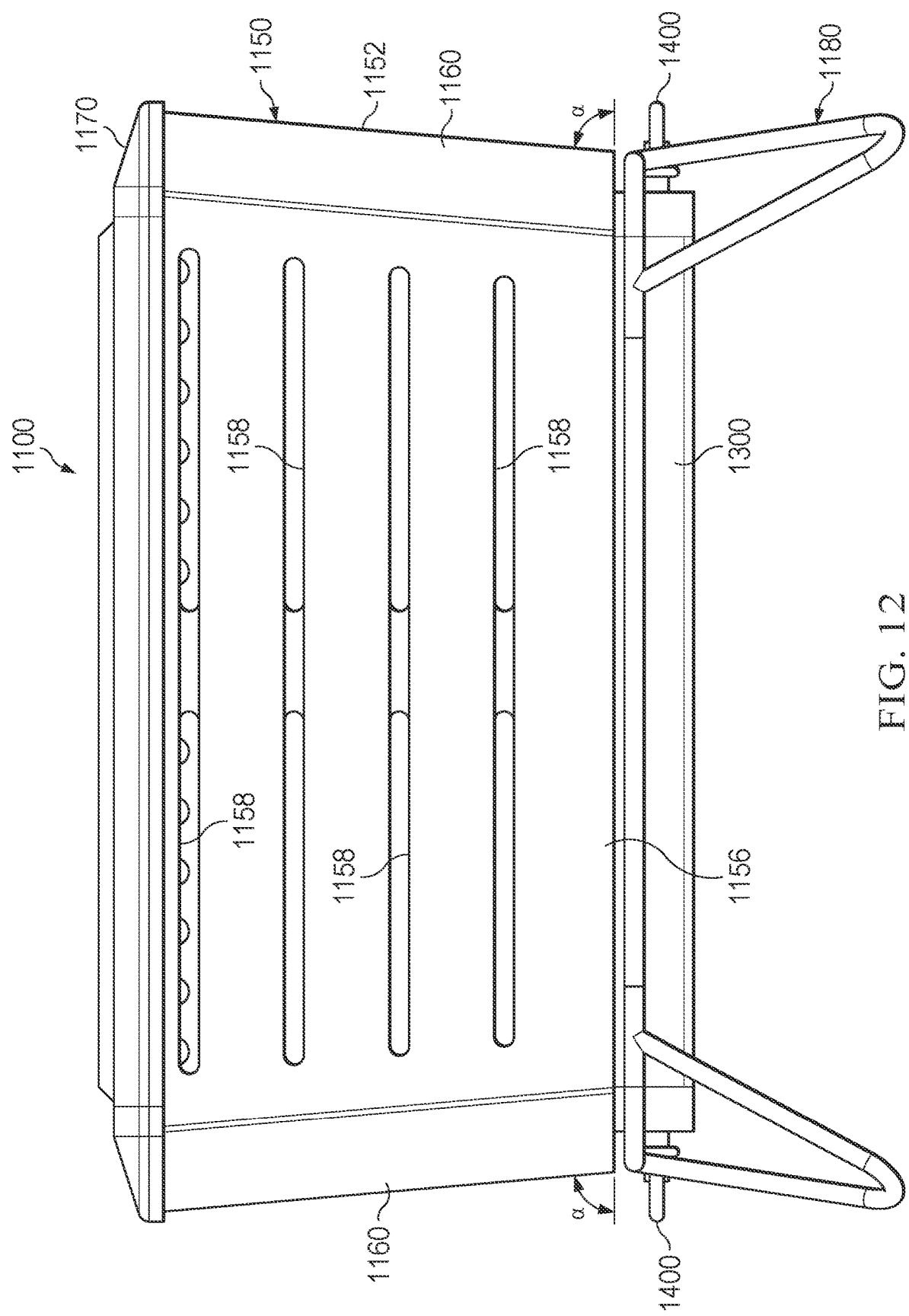
FIG. 12 is a side view of the fire pit of FIG. 11.
Figure 13:
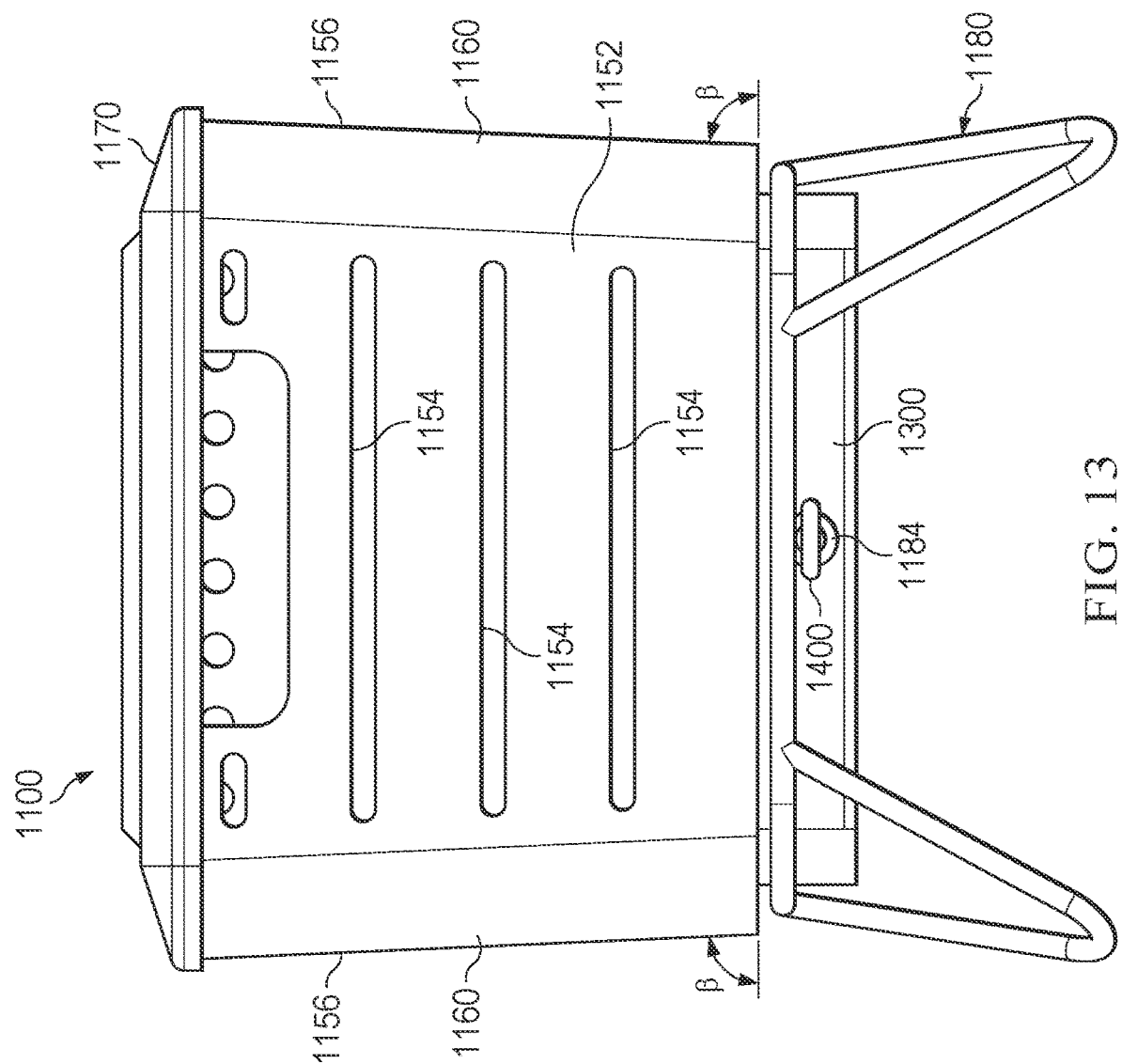
FIG. 13 is an end view of the fire pit of FIG. 11.
Figure 14:
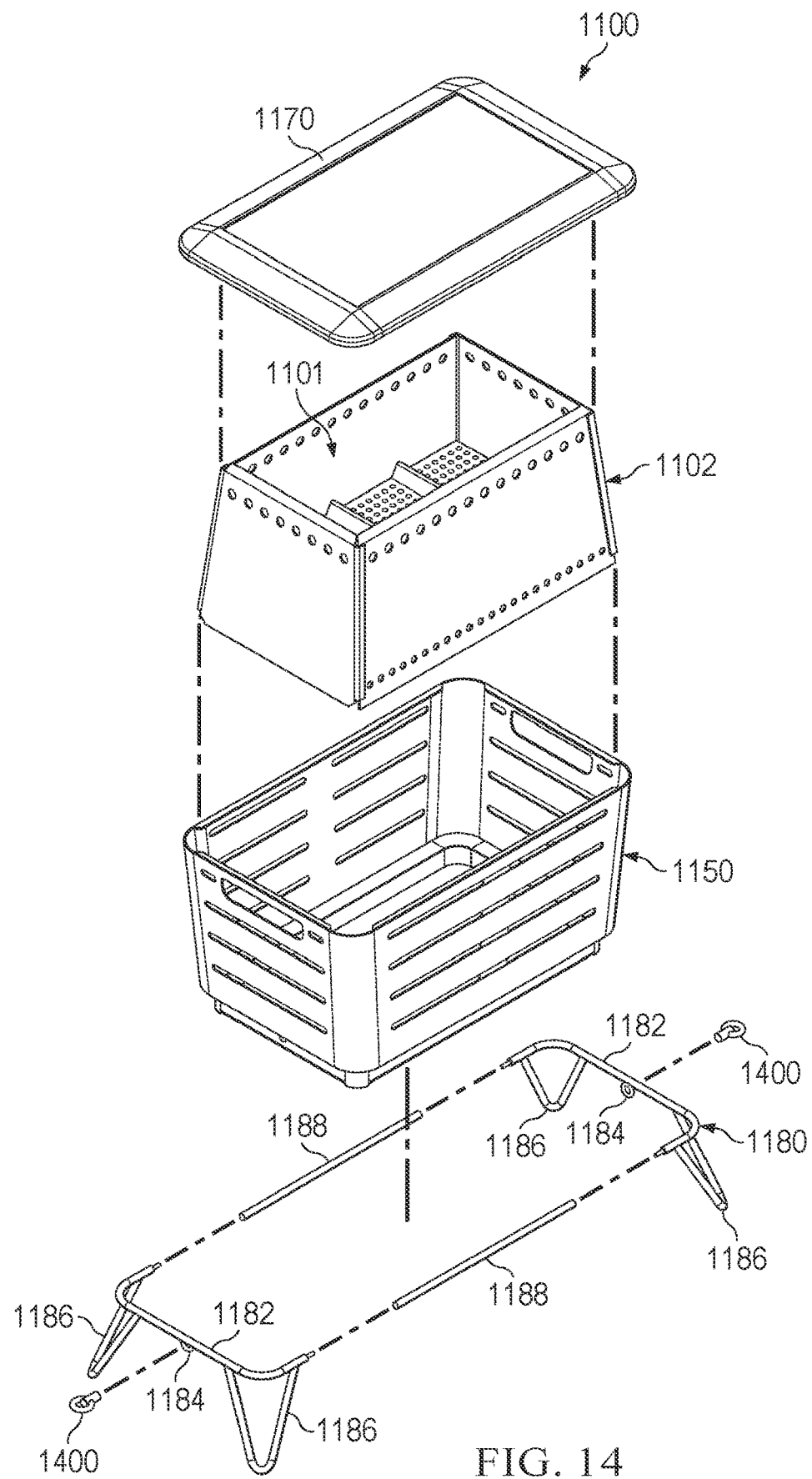
FIG. 14 is an exploded perspective view of the fire pit of FIG. 11.

Referring now to FIG. 11, a perspective view of another embodiment of a fire pit 1100 according to aspects of the present disclosure is shown. FIG. 12 is a side view, FIG. 13 is an end view, and FIG. 14 is an exploded perspective view of the fire pit 1100 of FIG. 11. An internal combustion chamber 1102 of the fire pit 1100 is specifically illustrated in FIG. 15 in end cutaway view and in FIG. 16 inside cutaway view. A plan view of a floor 1104 of the fire pit combustion chamber 1102 is shown in FIG. 17. Reference is made to these figures to describe various embodiments of the fire pit 1100.

The fire pit 1100 shares some structural and operational features with the fire pits discussed above, such as fire pit 500. However, the fire pit 1100 has an overall rectangular or otherwise rectilinear cross section rather than having a circular cross section. The fire pit 1100 comprises the inner combustion chamber 1102 having an inner chamber 1101 and is surrounded by an outer shroud 1150. The combustion chamber 1102 and shroud 1150 are spaced apart at least at a top thereof defining an intake chamber 1140. At or near the top of the fire pit 1100 a top cap 1170 covers the space between the combustion chamber 1102 and the shroud 1150. The combustion chamber 1102 and shroud 1150 may have a support stand 1180 to raise the fire pit 1100 to a desired height.

Figure 15:
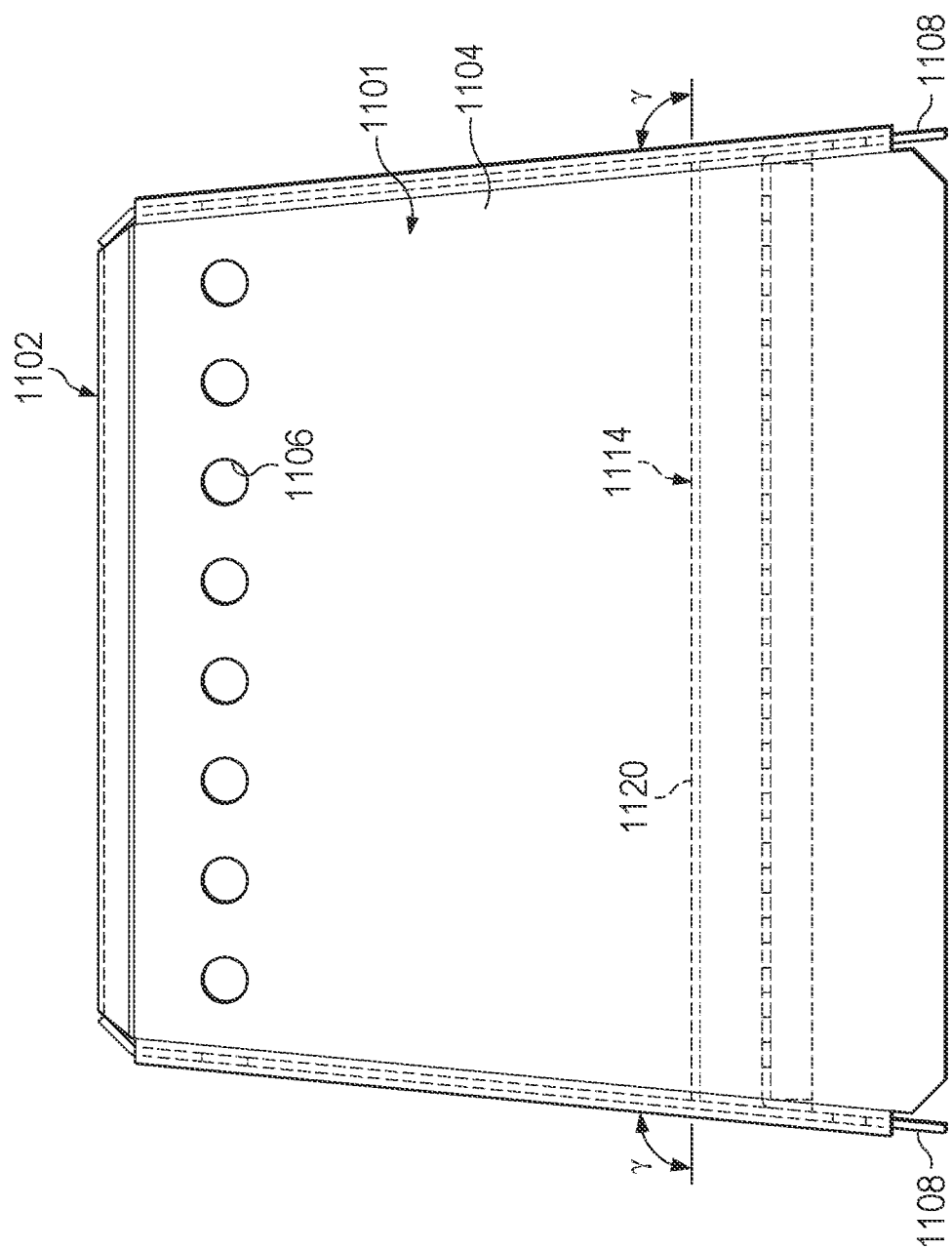
FIG. 15 is an end cutaway view of a fire pit combustion chamber according to aspects of the present disclosure.
Figure 16:
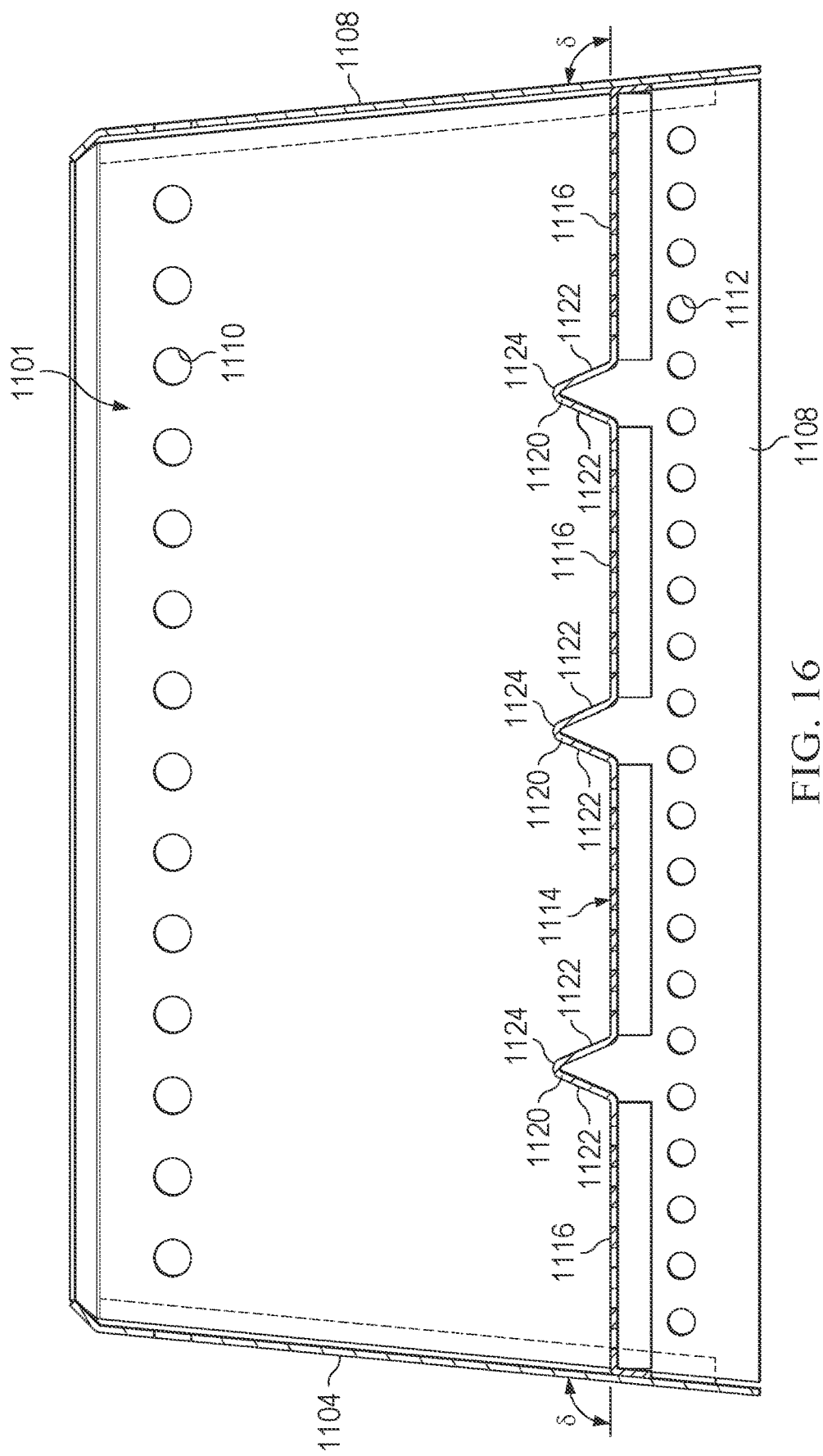
FIG. 16 is a side cutaway view of the fire pit combustion chamber of FIG. 15.
Figure 17:
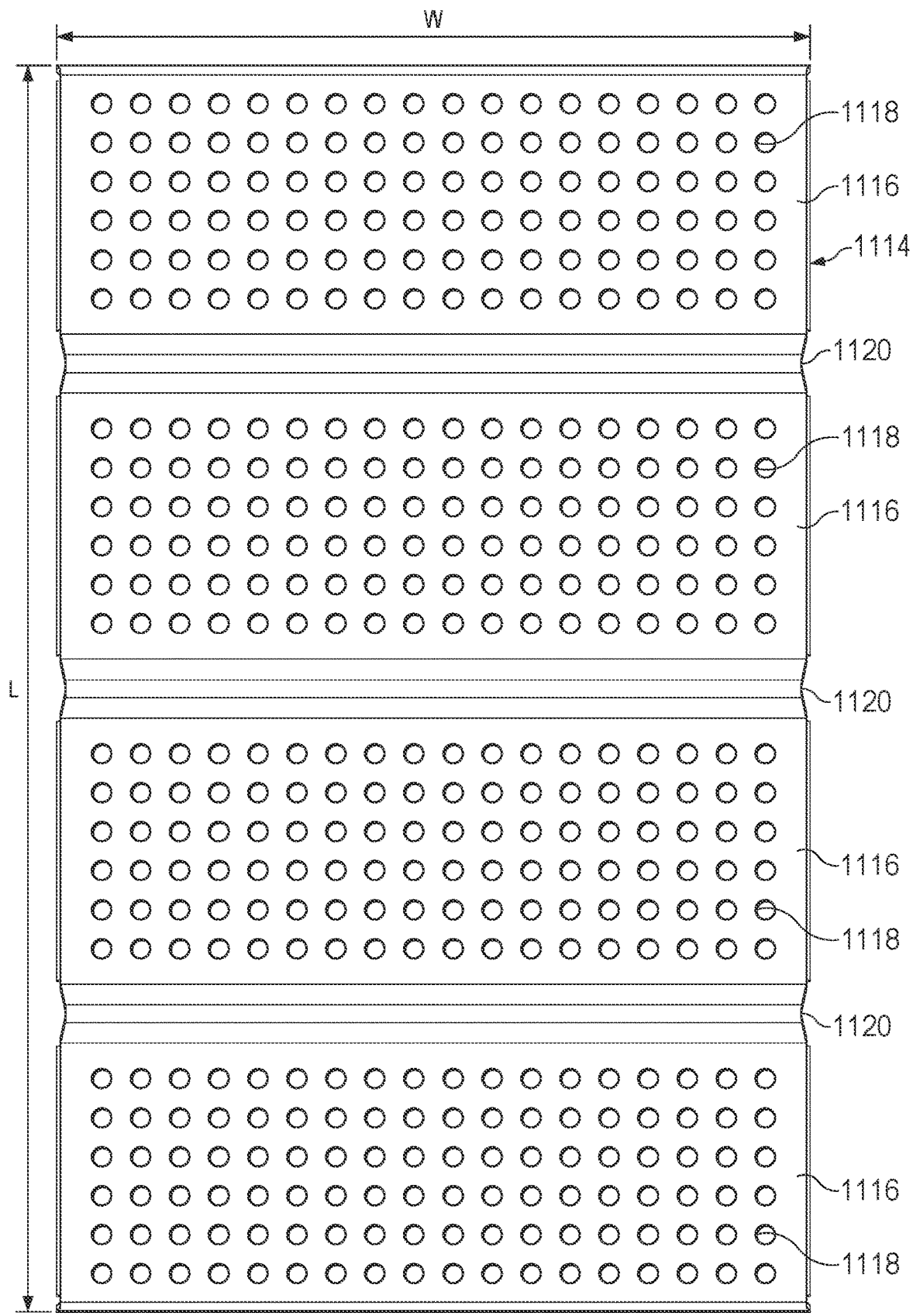
FIG. 17 is a plan view of the floor of the fire pit combustion chamber of FIG. 15.

The combustion chamber 1102 may comprise a pair of spaced apart side walls 1108 and a pair of spaced apart end walls 1104 (FIGS. 15-16). The combustion chamber 1100 provides some or all of the functionality of the inner wall 104 of the fire pit 500 discussed above (see, e.g., FIG. 8) but in a square or rectangular format. The walls 1104, 1108 bound and define the inner chamber 1101 in which combustion occurs. FIG. 14 illustrates the combustion chamber 1102 as a separate component. As shown, the combustion chamber 1100 represents what might be referred to as a parallelopipedon. Here, the walls 1104, 1108 are trapezoidal in shape and angled inward from bottom to top. The walls 1104, 1108 provide respective secondary combustion air apertures 1106, 1110 arranged along tops thereof. It has been found that inwardly angling the side walls 1104, 1108 of the combustion chamber 1102 promotes desired functionality of the combustion chamber 1102 such as increasing inward flow of secondary combustion air through apertures 1106, 1108.

As shown in FIG. 15 the walls 1104 may be arranged to angle inward at a specified angle γ. In some embodiments, the angle γ is 95.5° (measured from the normal outside the combustion chamber 1102) or 5.5° inward from vertical. In other embodiments, the angle γ may vary up to 5% or 10%. As shown in FIG. 16 the walls 1108 may be arranged to angle inward at a specified angle δ. In some embodiments, the angle δ is 95.5° (measured from the normal outside the combustion chamber 1102) or 5.5° inward from vertical. In other embodiments, the angle δ may vary up to 5% or 10%. In further embodiments, only one set of walls 1104, 1108 may have an angle departing from vertical, or the angles of the walls 1104, 1108 may differ such that γ and δ are not equal.

As can be seen in FIG. 16, the side walls 1108 may define a set of primary air apertures 1112 along a bottom thereof. These may be arranged below a floor 1114 of the combustion chamber 1102. In some embodiments, the floor 1114 is generally flat or planar and the apertures 1112 are generally in a level row. The floor 1114 may be arranged within the combustion chamber 1102 to be near but above the apertures 1112. The apertures 1112 may vary in size and/or shape but circular openings of about 10 mm, spaced apart 10 mm, are utilized in some embodiments with ideal performance. As shown, the primary air apertures are only present on the side walls 1108 and not the end walls 1104. However, other embodiments have primary air apertures on all combustion chamber walls, or only on end walls 1106, for example.

Secondary apertures 1106, 1110 are provided on each side wall (both of walls 1104 and 1108) in the illustrated embodiment. The provide secondary combustion air from the intake chamber 1140. This air may be at least partially heated by the combustion chamber 1102 as it travels through the shroud 1150 an intake chamber 1140 to reach the apertures 1106, 1110. The air is drawn into the combustion chamber 1102 by the convection of combusted and combusting gases and heat combined with the shape of the combustion chamber 1102 (e.g., inwardly angled walls 1104, 1108). The secondary air decreases smoke and increases visible flame and heat.

In various embodiments, the floor 1114 of the combustion chamber 1102 is level or substantially so. Therefore, it should be sized to occupy a horizontal section of the combustion chamber 1102 near the bottom thereof but above the primary air apertures 1112. As best seen in FIGS. 16 and 17 the floor 1114 may have a width W that is less than a length L. The length L corresponds to placement of the side walls 1108 and the width W corresponds to placement of the end walls 1104. The length and width of the floor 1114 will vary according to the overall shape of the combustion chamber 1102 (with the floor being square where the walls 1104, 1108 are all of equal length, for example).

The floor 1114 may comprise a plurality of perforated floor sections 1116 interposed with support ridges 1120. The floor sections 1116 define a plurality of perforations 1118 for admitting combustion air from below the floor 1114 (e.g., primary combustion air from apertures 1112). The ridges 1120 may traverse the width W of the floor 1114 such that the floor sections 1116 form reticulation sections of the floor 1114 with longer sides oriented parallel to the width W of the floor 1114. In other embodiments, the ridges 1120 and floor sections 1116 may be oriented differently. However, as shown, a stick of wood or bag of fuel oriented lengthwise with the floor 1114 would come to rest on one or more of the ridges 1120 and be at least partially elevated away from the perforations 1118 in the adjacent floor section 1116. In accordance with the foregoing, it should also be understood that the floor sections 1116 be flat or planar but not necessarily strictly so. However, the floor sections 1116 may remain sufficiently below the ridges 1120 such any fuel logs, bags, or other larger structures resting on the ridges are at least somewhat spaced apart from the adjacent floor section 1116 and some of the apertures 1118 therein.

In accordance with some embodiments, the ridges 1120 may comprise triangular peaked structures when view in cross section (FIG. 16). Upwardly sloping walls 1122 may join at a peak 1124. In other embodiments, the ridges 1120 may be curved or semi-circular in cross section. On other embodiments, the ridges 1120 may comprise upright walls and/or have square or rectangular cross sections. In any event, use of a triangular cross section as shown allows for a floor 1114 that may comprise a contiguous piece of material with relatively few bends required to form the required structure.

In some embodiments, the perforations 1118 may comprise circular openings of about 6 mm. The perforations may be spaced apart about 12 mm center-to-center along the width W and spaced apart about 14-15 mm center-to-center along the length L. The walls 1122 of the ridges 1120 may have a length of about 20 mm with an interior peak angle of about 80°.

In some embodiments, the floor 1114 may have a double walled construction. In such cases, upper and lower layers may generally conform to the same shape (e.g., as shown) and have the same openings and topological features. In other cases, a lower floor (not illustrated) may not have all the topological features (e.g., ridges 1120) and could be above or below the primary air apertures 1112).

The shroud 1150 generally surrounds the walls 1104, 1108 of the combustion chamber 1102 in a spaced apart fashion but may have an outwardly sloping configuration such that the intake chamber is wide nearer the cap 1170. The shroud may have walls that correspond to the walls 1104, 1108 of the combustion chamber 1102. As shown, end walls 1152 of the shroud 1150 are adjacent end walls 1104 of the combustion chamber and side walls 1156 of the shroud 1150 are adjacent side walls 1108 of the combustion chamber 1102.

End walls 1152 may join directly to side walls 1156 or they may join at rounded corner 1160 as shown. Slots 1154 may be provided in end walls 1152 while slots 1158 may be provided inside walls 1156 to admit air into the intake chamber 1140 for entry into the combustion chamber 1102 via apertures 1110, 1112, 1106. Air entering into the intake chamber 1140 may be heated by the combustion chamber 1102 before entering apertures 1110, 1112, 1106 in general and particularly before entering secondary air apertures 1106, 1110 as the air may have been near or in contact with the combustion chamber 1102 longer.

It should be understood that the slots 1154, 1158 could be divided into smaller openings such as shorter slots (see FIG. 12), more numerous round openings, mesh, etc. It is also possible to have more or fewer slots 1154, 1158 than shown and/or to have slots in the rounded corner joints 1160. In some embodiments, the walls 1154, 1158 are perforated or otherwise provided with openings sufficient to supply the combustion chamber 1102 with all the air it is possible for it to need while providing a substantial boundary or barrier to define the outside of the fire pit 1100.

The walls 1152, 1156 may angle outward rather than inward. As FIG. 12 shows, the end walls 1152 may angle outward at an angle α of about 85° from the horizontal (or 5° from the vertical/normal). The walls 1156 may angle outward at an angle β that is also about 85° from the horizontal (or 5° from the vertical/normal). In other embodiments α and β may differ up to 5%, 10%, or more and the angle may not be equal to one another.

Reference to FIG. 14 illustrates how major subcomponents of the fire pit 1100 may come together. The combustion chamber 1102 is arranged generally inside the shroud 1150 with the space between (e.g., the intake chamber 140) covered by top cap 1170. The support stand 1180 may attach to the shroud 1150 and comprise a number of additional components such as end pieces 1182 each having a pair of legs 1186 depending therefrom. End pieces 1182 may join together via side beams 1188. Each of the end pieces 1182 may provide a loop 1184 for passing detent pins 1400 that allows selective removal of an ash pan 1300 (FIG. 12-13), which may form a lower or floor portion of the shroud 1150.

Figure 18:
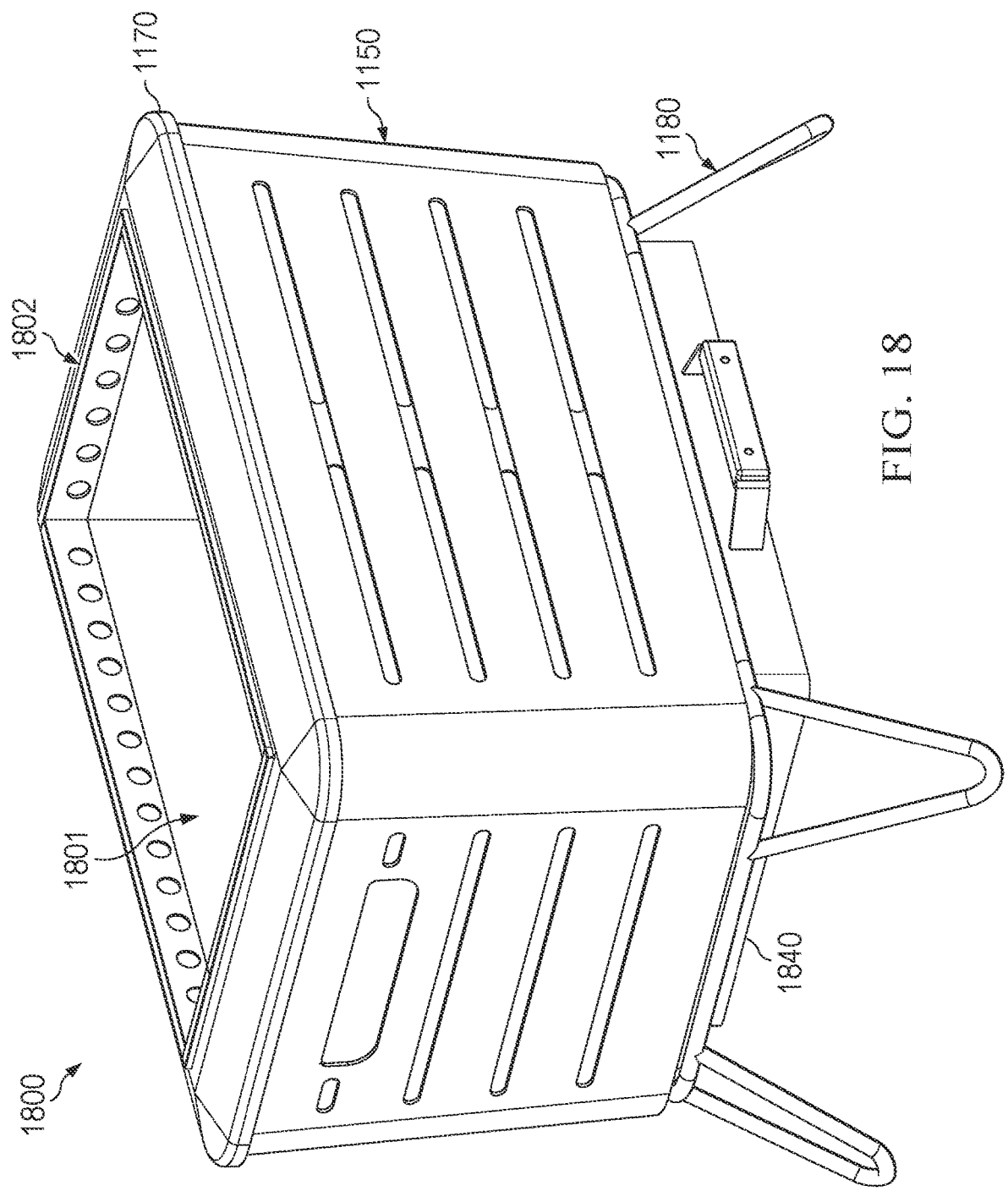
FIG. 18 is a perspective view of another fire pit according to aspects of the present disclosure.
Figure 19:
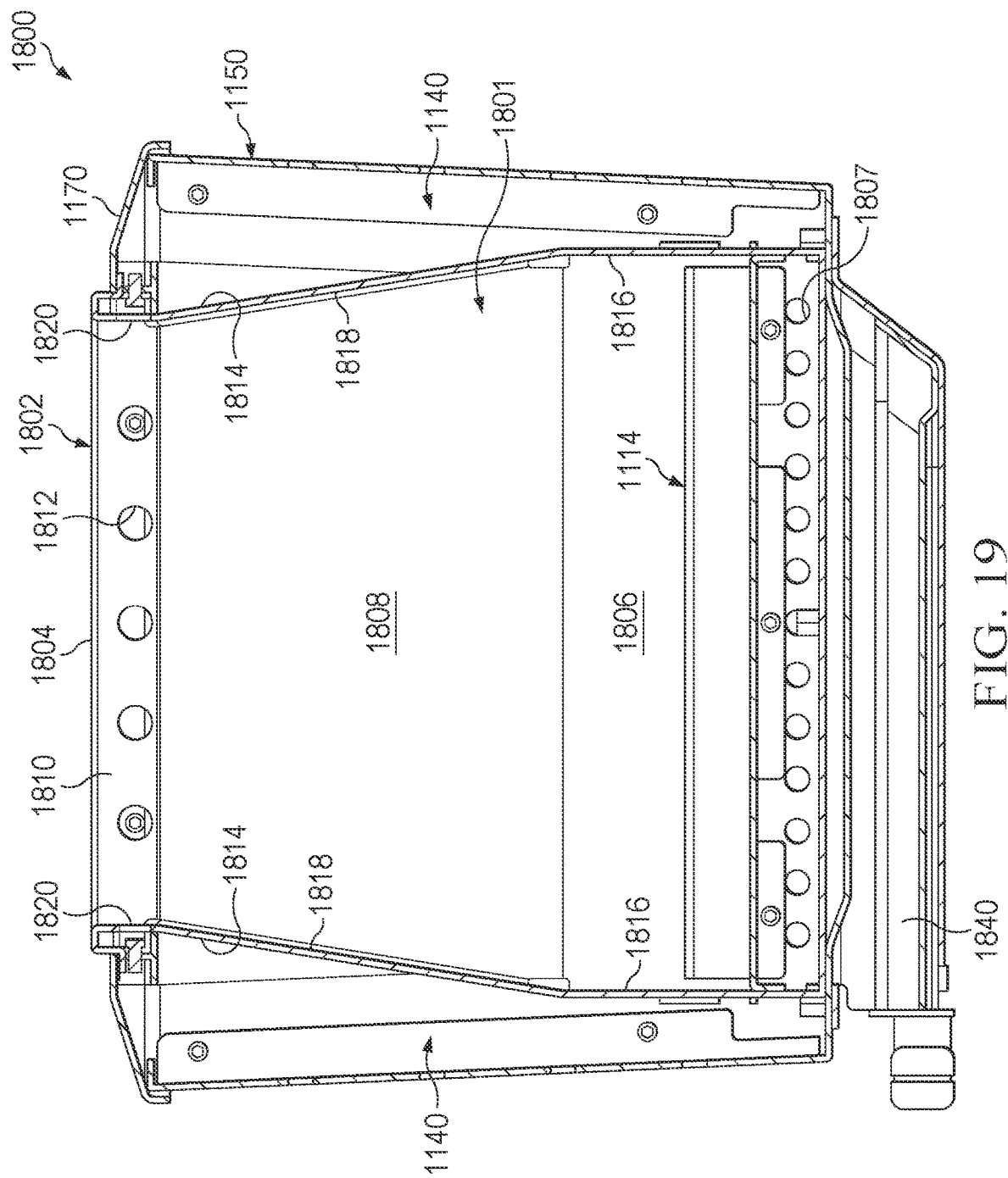
FIG. 19 is an end cutaway view of the fire pit of FIG. 18.
Figure 20:
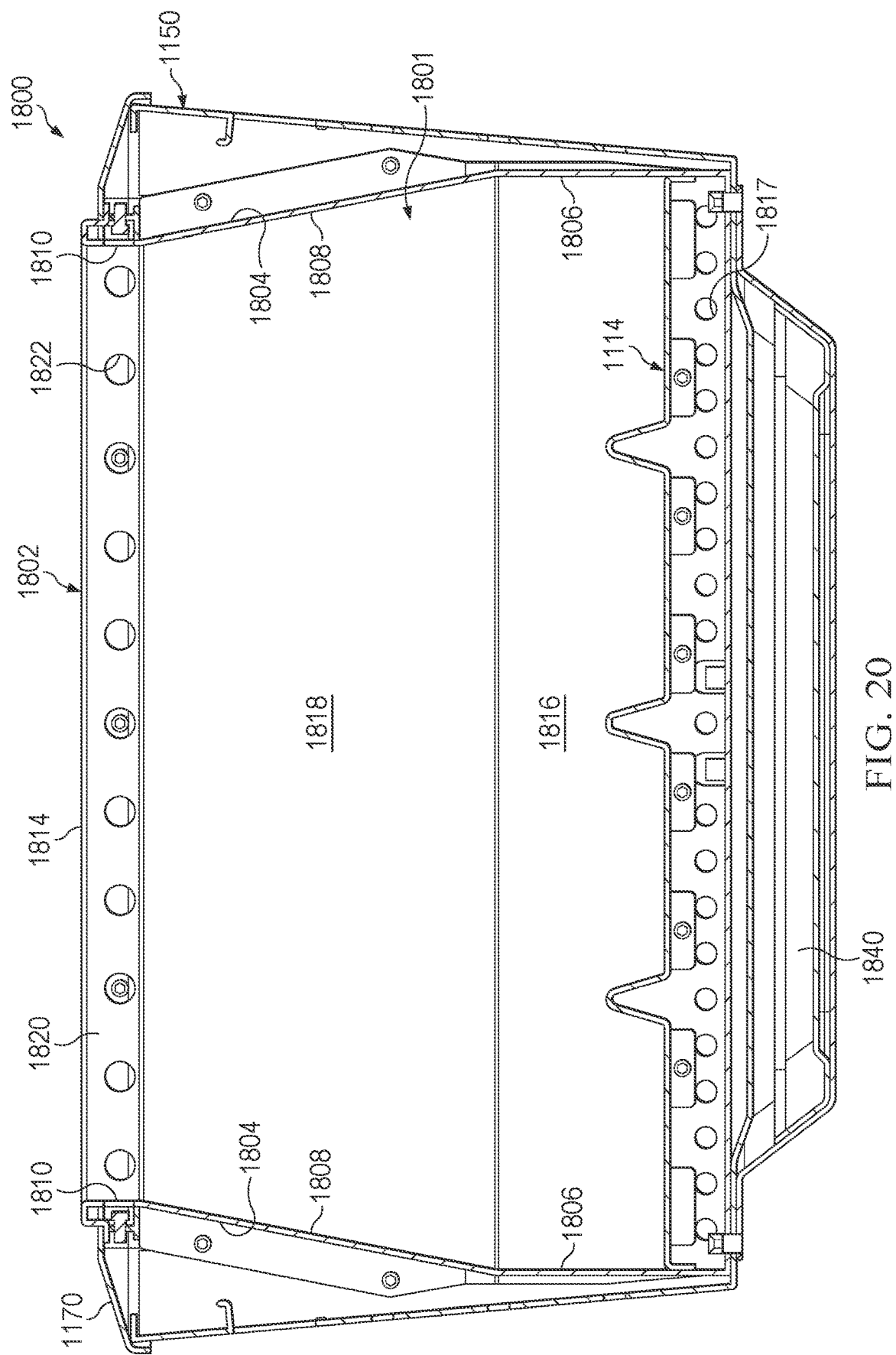
FIG. 20 is a side cutaway view of the fire pit of FIG. 18.

Referring now to FIG. 18, is a perspective view of another fire pit 1800 according to aspects of the present disclosure is shown. FIG. 19 is an end cutaway view and FIG. 20 is a side cutaway view of the fire pit 1800. The firepit 1800 has a shroud 1150 substantially similar or identical to the firepit 1100 described above. The support stand 1180 differs in that the loops 1184 for detent pins 1400 are absent as an ash pan 1840 is separately removable via a sliding engagement.

An interior combustion chamber 1802 of the fire pit 1800 differs in some respects from the combustion chamber 1102 described above. Although the combustion chamber 1802 defines an interior 1801 in which combustion occurs, end walls 1804 of the combustion chamber 1802 comprise a plurality of portions having angles that may differ. For example, end walls 1804 are formed from three vertically separate portions. A lower portion 1806 sits near the floor 1104 and an upper portion 1810 is opposite near the top. Between is a mid-portion 1808. The mid portion 1808 is angled inward (e.g., at the angles discussed above) but the lower portion 1806 is vertical, or nearly so, as is the upper portion 1810. Primary intake apertures 1807 may be formed in the lower portion 1806 (e.g., below but near the floor 1114) while secondary intake apertures 1812 are defined in the upper portion 1810.

Side walls 1814 may also be divided into vertically sperate portions that may or may not correspond to those of the end walls 1804. Here the side walls 1814 have a lower portion 1816 near the floor 1114 providing primary intake apertures 1817 therein (e.g., below the floor 1114). A mid portion 1818 is angled inward (at the same or a different angle than mid portion 1808). An upper portion 1820 of sidewalls 1814 is near a top of the combustion chamber 1802 and may define secondary intake apertures 1822. The lower portion 1816 and upper portion 1820 may be substantially vertical or have an angle differing from the mid portion 1818.

Similar to the fire pit 1100, the firepit 1800 may have a square, rather than rectangular, cross section. The respective walls, 1804, 1808, having a variable angle from bottom to top can allow for finer control over the combustion processes in the combustion chamber 1802. For example, the angle of the upper portions 1810, 1820 allows for angles of the respective secondary intake apertures 1812, 1822 to be adjusted for various performance considerations. Similarly, lower portions 1806, 1816 may remain vertical or only slightly angled so as to promote combustion while the mid portions 1808, 1818 may angle inward to increase the speed of rising combustion gases and increase the "draw" of secondary combustion air into apertures 1812, 1822 for reduction of smoke and increase in flame appearance and brightness. The mid portions 1808, 1818 may have the same or different angles as the respective end walls 1152 and side walls 1156 of the combustion chamber 1102, for example.

The floor 1114 of the combustion chamber 1802 may be similar or identical to the floor 1114 of the combustion chamber 1102. For example, it may have the same perforations and topography (e.g., ridges 1120) and may also be double walled/double layered.

In the present disclosure, fire pits having a generally circular and generally horizontal cross section are shown and described. For example, fire pits 100, 500 may be considered generally circular while fire pits 1100 and 1800 may be considered generally rectilinear. Some advantages may be observed with both circular and rectilinear embodiments. However, further embodiments having additional internal or external geometries are contemplated within the present disclosure. For example, a fire pit may have an arbitrary number of sides and the sides may be of equal or unequal length. Additionally, various non-linearities and curvatures may be presented. Unless the language of an appended claim requires a specific geometry, shape, number of sides, etc., functionally equivalent variations are intended to be within the scope of the claimed invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A fire pit comprising:
   a combustion chamber having at least one wall defining an inner chamber;
   at least one primary air aperture defined through the inner chamber wall at a first, lower level;
   at least one secondary air aperture defined through the inner chamber wall at a second, upper level;
   a fuel grate supported within the inner chamber at a level between the lower level and the upper level;
   a shroud surrounding the at least one wall and being spaced apart therefrom to define an intake chamber;
   wherein solid fuel supported by the fuel grate, when combusted, is provided primary combustion air from below the fuel grate by the primary air apertures and provided secondary combustion air from above the solid fuel by the secondary air apertures, the secondary combustion air promoting combustion of unburned gasified combustibles rising within the inner chamber;
   wherein the at least one wall is formed into a frustoconical configuration with a narrower upper end and a wider bottom end;
   wherein the shroud defines at least one aperture for admitting air to the intake chamber from outside the firepit; and
   wherein the shroud comprises a frustoconical configuration with a taper opposite a taper of the at least one inner wall.

2. The firepit of claim 1, wherein the fuel grate comprises at least one ridge extending upwardly therefrom.

* * * * *